United States Patent
Kuboyama

[11] Patent Number: 5,615,324
[45] Date of Patent: Mar. 25, 1997

[54] DISTRIBUTED IMAGE PROCESSING APPARATUS

[75] Inventor: Shoichi Kuboyama, Kawasaki, Japan

[73] Assignee: Fujitsu Limited, Kawasaki, Japan

[21] Appl. No.: 380,692

[22] Filed: Jan. 30, 1995

[30] Foreign Application Priority Data

Mar. 17, 1994 [JP] Japan .................................. 6-046824

[51] Int. Cl.⁶ .................................................. G06F 15/00
[52] U.S. Cl. .......................................................... 395/141
[58] Field of Search ............................. 395/133, 162, 395/141, 142, 143; 345/118, 121

[56] References Cited

U.S. PATENT DOCUMENTS

| | | | |
|---|---|---|---|
| 4,849,910 | 7/1989 | Jacobs et al. | 364/519 |
| 4,876,457 | 10/1989 | Bose | 250/563 |
| 5,247,610 | 9/1993 | Oshima et al. | 395/135 |
| 5,309,549 | 5/1994 | Iwamoto et al. | 395/121 |
| 5,325,476 | 6/1994 | Takii et al. | 395/141 |
| 5,469,513 | 11/1995 | Kurumida | 382/203 |
| 5,471,574 | 11/1995 | Prasad | 395/142 |

FOREIGN PATENT DOCUMENTS

| | | |
|---|---|---|
| 0475724 | 3/1992 | European Pat. Off. |
| 486304 | 5/1992 | European Pat. Off. |
| 93/00628 | 1/1993 | WIPO |
| 94/08291 | 4/1994 | WIPO |

*Primary Examiner*—Phu K. Nguyen
*Attorney, Agent, or Firm*—Staas & Halsey

[57] ABSTRACT

A processing unit (workstation) is connected through a communication line to an image managing unit (server) to manage a data base in which real image data has been stored. A teaching data forming section of the processing unit forms mask teaching data indicative of an object outline with respect to thin-out image data obtained from the real image data stored in the data base as a target and transfers to the image managing unit as a server. A mask data forming section of the image managing section forms mask data indicative of the object outline from the real image data in the data base by using the transferred mask teaching data as a reference (guidance).

23 Claims, 26 Drawing Sheets

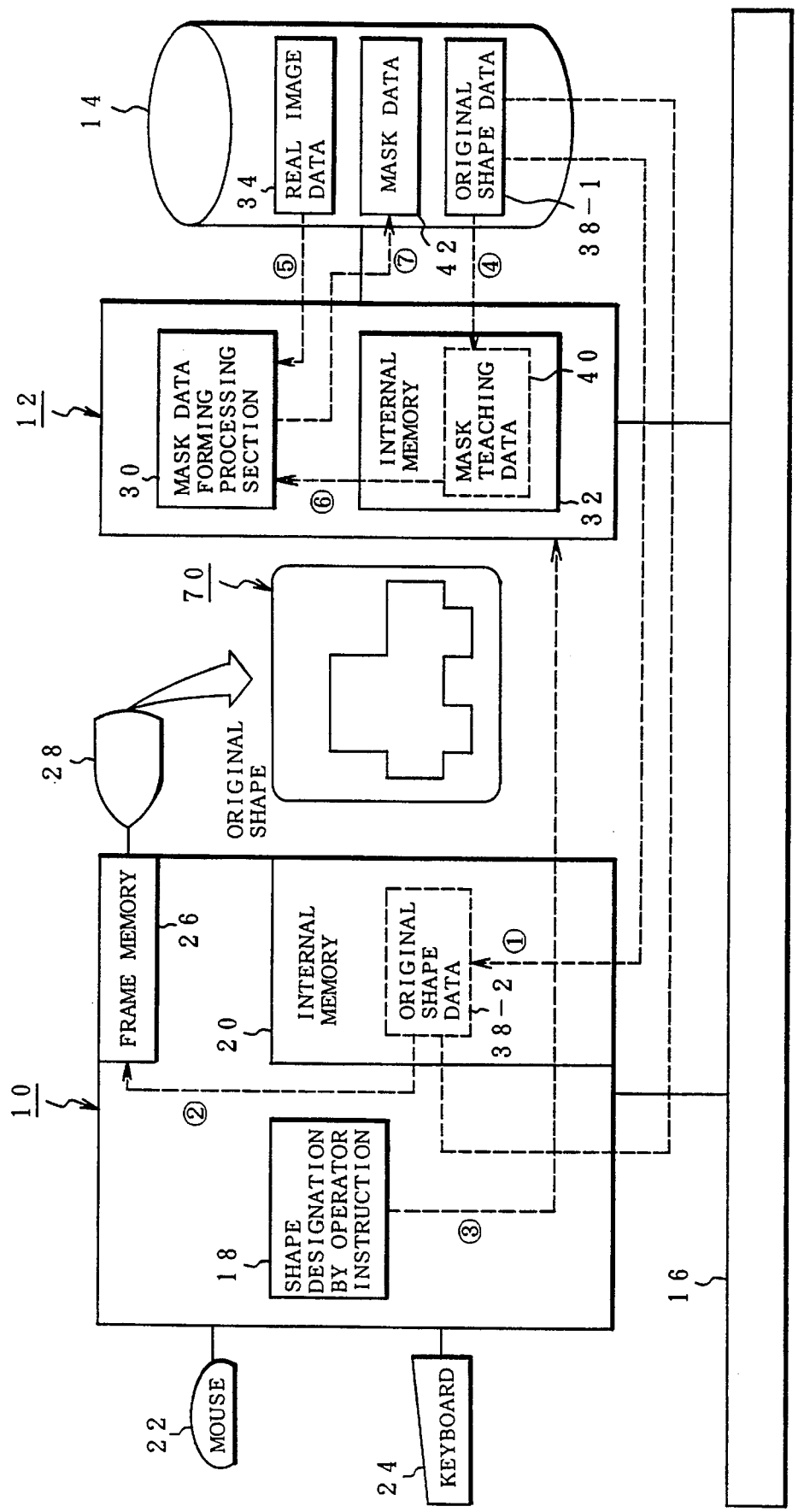

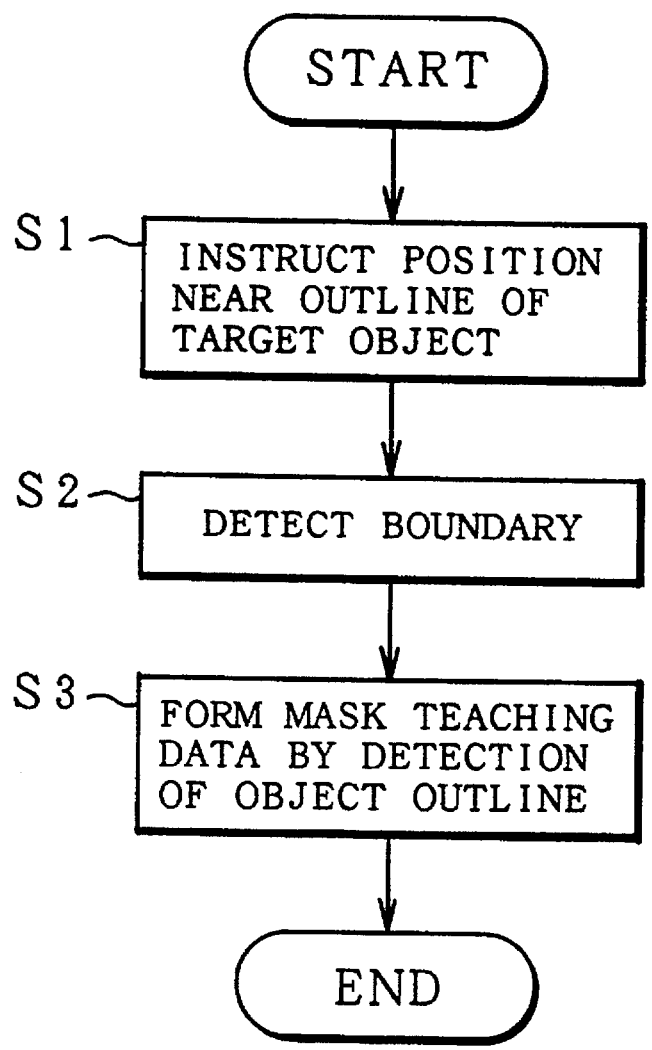

82 INSTRUCTED BOUNDARY AREA

76 OUTLINE OF OBJECT

BACKGROUND
(R0, G0, B0)

OBJECT COLOR
(R1, G1, B1)

→ THRESHOLD VALUE
((R0+R1)/2, (G0+G1)/2, (B0+B1)/2)

DISTRIBUTED IMAGE PROCESSING APPARATUS

BACKGROUND OF THE INVENTION

The present invention relates to an image processing apparatus for forming mask data which is used for image synthesis or color adjustment from image data and, more particularly, to a distributed image processing apparatus for efficiently forming mask data by a distributed process of a server client system or the like.

In recent years, due to the realization of a high integration degree of memory devices and a high speed of a processor and the appearance of devices having advanced functions such as display having a high resolution, plotter having a high resolution, color print, and the like, various editing processes such as synthesis, color conversion, and the like of color image data are being realized as a desk-top publishing (DTP) for enabling image data stored in a data base to be processed as a target by a single workstation or personal computer. In this case, the formation of mask data which is used to extract an object in the image edition causes a problem. That is, in the editing work of an image, various mask data for extraction which are matched with the image are necessary. In the formation of the mask data, the precision, high processing speed, and easiness of the formation by the operator become subjects.

FIG. 1 shows a distributed process to produce mask data which is executed for a conventional server client system as a target. A workstation 210 serving as a processing machine is connected to a server unit 212 through a local area network (LAN) 216. The server unit 212 manages a data base 214 in which actual image data has been stored. The workstation 210 comprises: a mask data processing section 218 which is realized by a processor; an internal memory 220; a mouse 222; a keyboard 224; a frame memory 226; and a color display 228.

Hitherto, mask data is produced as follows. When the operator of the workstation 210 requests a transfer of image data as a processing target to the server unit 212, the server unit 212 selects and reads out real image data from the data base 214 and transfers. In this instance, in order to directly transfer the real image data from the server unit 212, an internal memory on the workstation has to be set to a large capacity, so that the system costs increase. It also takes a long time to transfer the image data and the system performance also deteriorates. Further, as compared with a resolution of the real image data, a resolution of the color display 228 of the workstation 210 is generally low. Even when the real image data is transmitted, an image can be displayed at only a low resolution, so that the real image data becomes in vain. From those reasons, in the server unit 212, the thin-out image data obtained by thinning out the real image data is transferred to the workstation 210. When receiving the thin-out image data transferred, the workstation 210 executes a process to form mask data that is necessary by the mask data processing section 218 with respect to the thin-out image data stored in the internal memory 220 as a target. The forming process of the mask data is executed by a manual operation such that the outline of the object is designated one pixel by one with respect to the image displayed on the display 228 as a target. Since a burden on the operator is large, however, there is also realized an algorithm for searching an outline and automatically forming mask data by a difference calculus using a difference change of boundary pixels, a color mixing method using a color mixture ratio from an object color to a background color in a boundary portion, or the like. When the mask data can be formed in the workstation 210, it is sent to the server unit 212 and stored into the data base 214.

There are, however, the following problems in the conventional mask pattern forming process using such a thin-out image data. The extraction of the object image using the mask data in the image synthesis or color adjustment is executed by the server unit 212 for the real image data as a target in order to obtain a high precision. The mask data that is used for extraction of the mask data, however, is the data formed from the thin-out image data. There is a deviation between the real image data and the object outline and a problem of the extracting precision occurs. To solve such a problem, a method whereby an interpolating process is subjected to the mask data and, after that, it is used for extraction of the real image data is also considered. The errors are, however, not always perfectly eliminated by the interpolation. Therefore, in order to make it possible to perform the extraction at a high precision using the mask data, it cannot help sending the real image data to the workstation and forming the mask data. Consequently, the memory size increases, it takes a long time to load and transfer the image data, the costs in case of executing the distributed process increase, and the system performance deteriorates.

SUMMARY OF THE INVENTION

According to the invention, there is provided a distributed image processing apparatus in which even if a processing target in a workstation is thin-out image data, a mask pattern of a high precision can be formed on the server side, the costs can be reduced, and the system performance can be improved.

A distributed image processing apparatus of the invention has a system construction in which a processing unit is connected through a communication line to an image management unit for managing a data base in which real image data has been stored. Specifically speaking, a server client system is constructed by using the image management unit as a server and by using the processing unit as a client. The client is connected as a workstation to the server by a local area network.

A teaching data forming section for forming mask teaching data indicative of an object outline with respect to the thin-out image data obtained from the real image data stored in the data base as a target and for transferring the mask teaching data to the image management unit as a server is provided for a processing unit using the workstation. A mask data forming section for forming mask data indicative of the object outline from the real image data in the data base by using the mask teaching data transferred from the teaching data forming section as a reference (guidance) is provided for the image management unit as a server. It is desirable that the thin-out image data derived from the real image data is previously stored in the data base.

The teaching data forming section of the workstation forms the mask teaching data indicative of the object outline in accordance with an instruction from the operator with regard to the thin-out image data as a target (manual mode). The teaching data forming section also automatically forms the mask teaching data indicative of the object outline with respect to the thin-out image data as a target (perfect auto mode). Further, the teaching data forming section automatically forms the mask teaching data indicative of the object outline on the basis of the outline information indicated by the operator with respect to the thin-out image data as a target (semi-auto mode). There are the following three semi-auto modes which are intervened by the operator.

I. The teaching data forming section detects a boundary point on the basis of the designated point indicative of a location near the outline of the target object designated by the operator, sequentially searches the boundary point on the outline from the detected boundary point, and forms the mask teaching data indicative of the object outline.

II. The teaching data forming section searches the inside of the boundary region including the outline of the target object designated by the operator and forms the mask teaching data indicative of the object outline.

III. The teaching data forming section detects each boundary point on the basis of a plurality of designated point information indicative of locations near the outline of the target object designated by the operator, sequentially searches the boundary point on the outline in accordance with a path connecting the plurality of boundary points detected, and forms the mask teaching data indicative of the object outline.

In the automatic search by the teaching data forming section, there are a difference calculus and a color mixing method. According to the difference calculus, the boundary point is searched on the basis of the difference value of the image data in the outline region and the mask teaching data indicative of the object outline is formed. Ordinarily, the point at which the difference peak value is obtained becomes the boundary point. According to the color mixing method, the color mixture ratio in a range from 1 to 0 in the boundary portion is calculated on the basis of the object color and the background color of the target object. The boundary point at which a specified color mixture ratio, for example, 0.5 is obtained is searched, and the mask teaching data indicative of the object outline is formed.

The teaching data forming section overlaps the searched mask teaching data onto the thin-out image data displayed on a display and displays the resultant overlapped data, thereby enabling the abnormal search to be monitored by the operator. The teaching data forming section has an editing function for correcting the mask teaching data displayed on the display on the basis of an instruction from the operator.

As a method of forming the mask teaching data without using the thin-out image data, original shape data of the target object can be also used in the present invention. That is, in addition to the real image data, one or a plurality of original shape data indicative of the object shape as a target to form the mask data are previously stored in the data base. The teaching data forming section provided in the processing unit selects the original shaped data adapted to the object as a target to detect the outline in the thin-out image data derived from the real image data in the data base as mask teaching data and notifies it to the server unit.

The mask data forming section of the image management unit forms the mask data indicative of the object outline from the real image data in the data base by using the mask teaching data (original shape data) transferred from the teaching data forming section as a reference (guidance). To select the original shape data that is used, the teaching data forming section overlaps the selected original shape data onto the thin-out image data displayed on the display and displays the resultant overlapped data, thereby allowing the operator to judge the adaptability.

The mask data forming section provided for the image management unit as a server automatically forms the mask data indicative of the object outline on the basis of the mask teaching data transferred from the workstation side with respect to the real image data as a target.

According to the distributed image processing apparatus of the invention, the thin-out image data is transferred to the workstation and the mask teaching data is formed and returned to the server and forms the mask data from the real image data by using the mask teaching data as a guidance. Therefore, the processes of the workstation and the server are completely made independent, the memory capacity of the workstation is reduced, and the data transfer time is also short. That is, since the workstation handles the small capacity of data such as thin-out image data, a throughput to the operator can be improved. The server searches the outline by using the teaching data as a guidance and forms the mask data. Therefore, even when the operator doesn't directly intervene, the mask data can be formed at a high precision without causing an abnormal outline detection. An image construction using the mask data and the extracting precision in the color adjustment can be guaranteed.

The above and other objects, features, and advantages of the present invention will become more apparent from the following detailed description with reference to the drawings.

BRIEF DESCRIPTION OF THE DRAWINGS

FIG. 8 is an explanatory diagram for a forming process of mask teaching data using original shape data in FIG. 5;

FIG. 9 is a flowchart for a forming procedure of mask teaching data in the semi-auto mode according to the invention;

DETAILED DESCRIPTION OF THE PREFERRED EMBODIMENTS

Construction and Functions of Apparatus

Figure 1:
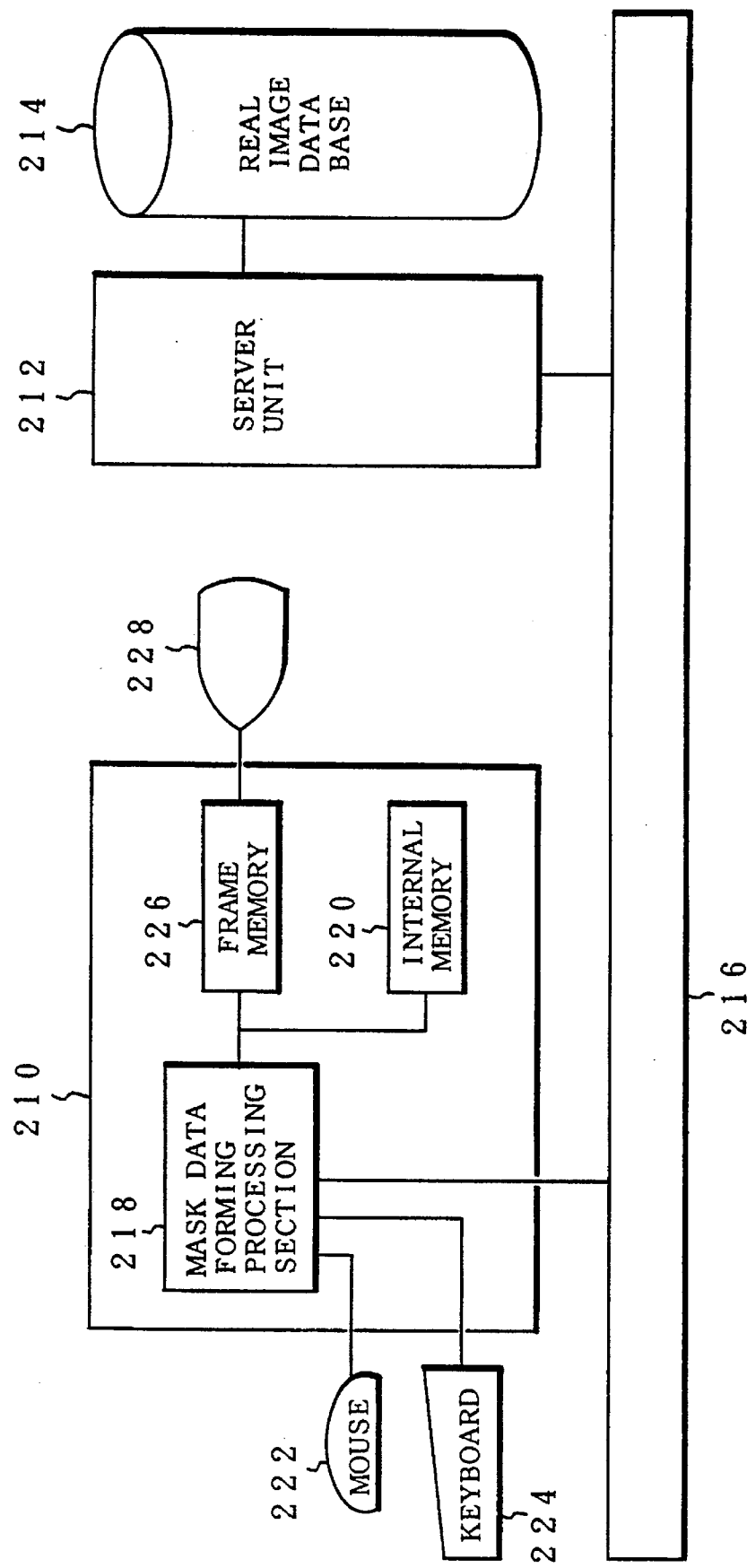
FIG. 1 is a block diagram of a conventional distributed image process.
Figure 2:
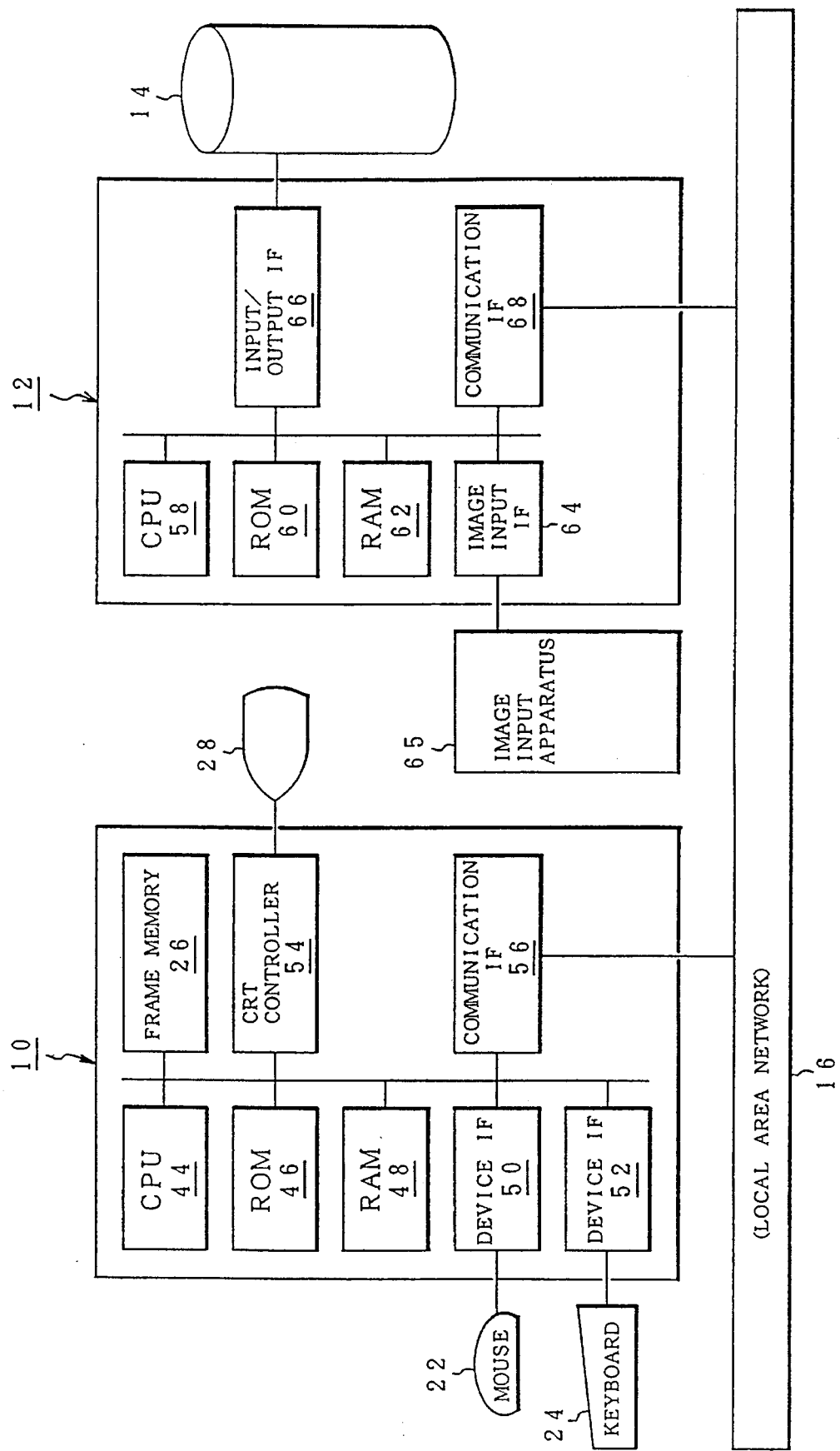
FIG. 2 is a block diagram of a hardware construction of the invention.

FIG. 2 shows an embodiment of a hardware construction of a distributed image processing apparatus according to the invention. A workstation 10 which functions as a client is connected to a server unit 12 through a local area network (LAN) 16. A data base 14 in which various real image data has been stored is provided for the server unit 12 which functions as an image management unit. The workstation 10 has therein a CPU 44. An ROM 46, an RAM 48, a device interface 50 to which a mouse 22 is connected, a device interface 52 to which a keyboard 24 is connected, a CRT controller 54 to control a frame memory 26 and a color display 28, and a communication interface 56 are connected to an internal bus of the CPU 44. The server unit 12 has therein a CPU 58. An ROM 60, an RAM 62, an image input interface 64 to which an image input apparatus 65 for inputting the real image data is connected, an input/output interface 66 to which the data base 14 is connected, and a communication interface 68 are connected to an internal bus of the CPU 58. For example, an image scanner or the like is used as an image input apparatus 65 connected to the server unit 12. The image scanner reads image information of a photograph, a printed matter, or the like and generates real image data as color signals such as RGB signals, YUV signals, or the like.

Figure 3:
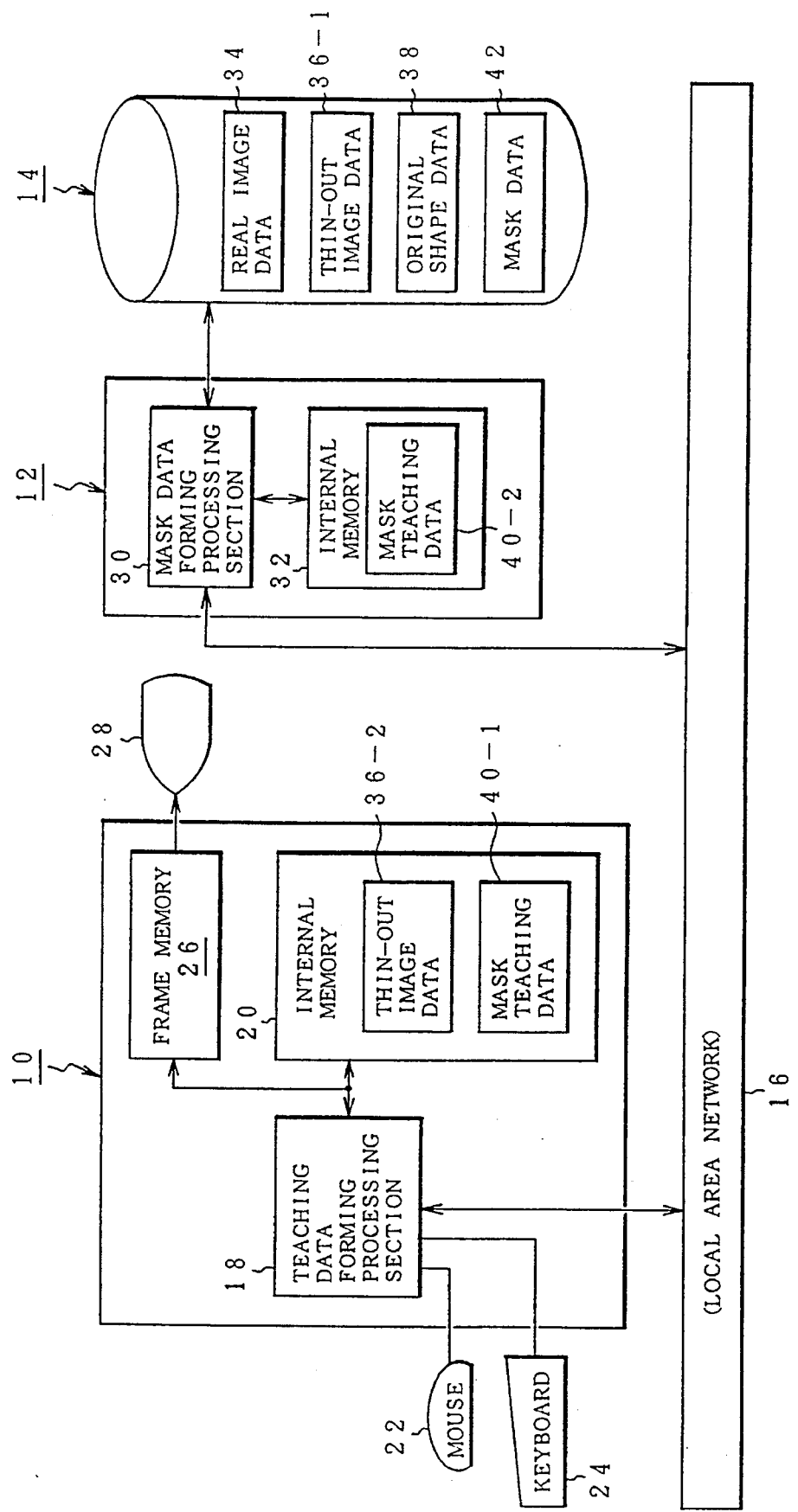
FIG. 3 is a block diagram showing processing functions of the invention.

FIG. 3 shows functions of the distributed image processing apparatus of the invention. Real image data 34 has been stored in the data base 14 provided for the server unit 12. The real image data 34 has a high resolution that is determined by the performance of the image input apparatus 65 such as an image scanner or the like in FIG. 2. For example, the real image data has a resolution of 400 dpi. On the other hand, a display resolution of the color display 28 provided for the workstation 10 is set to 200 dpi corresponding to ½ of that of the real image data. Thin-out image data 36-1 obtained by a thin-out process of the real image data 34 has been stored in the data base 14. For example, assuming that the real image data 34 has a resolution of 400 dpi, the data is thinned out one pixel by one, thereby obtaining the thin-out image data 36-1 of 200 dpi. Further, original shape data 38 which can be directly selected and used as mask teaching data has been stored in the data base 14. The original shape data 38 is 3-dimensional data indicative of an outline of an object image as an extraction target included in the real image data 34. The position and size (enlargement, reduction) of the original shape data 38 can be changed by a 3-dimensional coordinates converting process, so that fundamental data adapted to the object included in the real image data 34 is derived. Further, mask data 42 formed finally by the server unit 14 is also stored in the data base 14.

As for the workstation 10, a function of a teaching data forming processing section 18 is realized by a program control by the CPU 44 in FIG. 2. In accordance with an instruction of the operator through the mouse 22 or keyboard 24, the teaching data forming processing section 18 requests the server unit 12 to transfer the thin-out image data as a target to form mask data, thereby allowing transferred thin-out image data 36-2 to be stored into an internal memory 20. When the thin-out image data 36-2 is derived, the teaching data forming processing section 18 transfers the thin-out image data 36-2 to the frame memory 26 and displays on the color display 28. In this state, the teaching data forming processing section 18 executes a process to form mask teaching data. There are the following four kinds of modes in the forming process of the mask teaching data by the teaching data forming processing section 18.

Mode 1: Perfect manual

Mode 2: Perfect auto

Mode 3: Semi-auto

Mode 4: Shape designation

After completion of the forming process in the teaching data forming processing section 18, mask teaching data 40-1 is obtained in the internal memory 20. The mask teaching data 40-1 is sent to the server unit 12, thereby requesting a forming process of mask data.

A mask data forming processing section 30 is provided for the server unit 12 as a function which is realized by a program control of the CPU 58 in FIG. 2. The mask data forming processing section 30 executes a data transfer process in response to the transfer request of the thin-out image data from the workstation 10 and a mask data forming process based on mask teaching data 40-2 transferred from the workstation 10 to an internal memory 32. In the forming process of the mask data by the mask data forming processing section 30, an outline of the target object is automatically searched and the mask data 42 is formed by using the mask teaching data 40-2 in the internal memory 32 sent from the workstation 10 as a guidance with respect to the real image data 34 in the data base 14 as a target. In the formation of the teaching data using the original shape data 38 in the data base 14, in addition to the thin-out image data 36-2, the original shape data 38 is sent to the workstation 10 and the operator selects a plurality of original shape data and overlap them onto the thin-out image data displayed on the color display 28 and displays the resultant overlapped image. The original shape data adapted to the target object to form a mask pattern is selected as mask teaching data 40-1 in such an overlapped display state.

Formation of Mask Teaching Data by Distributed Processes

Figure 4:
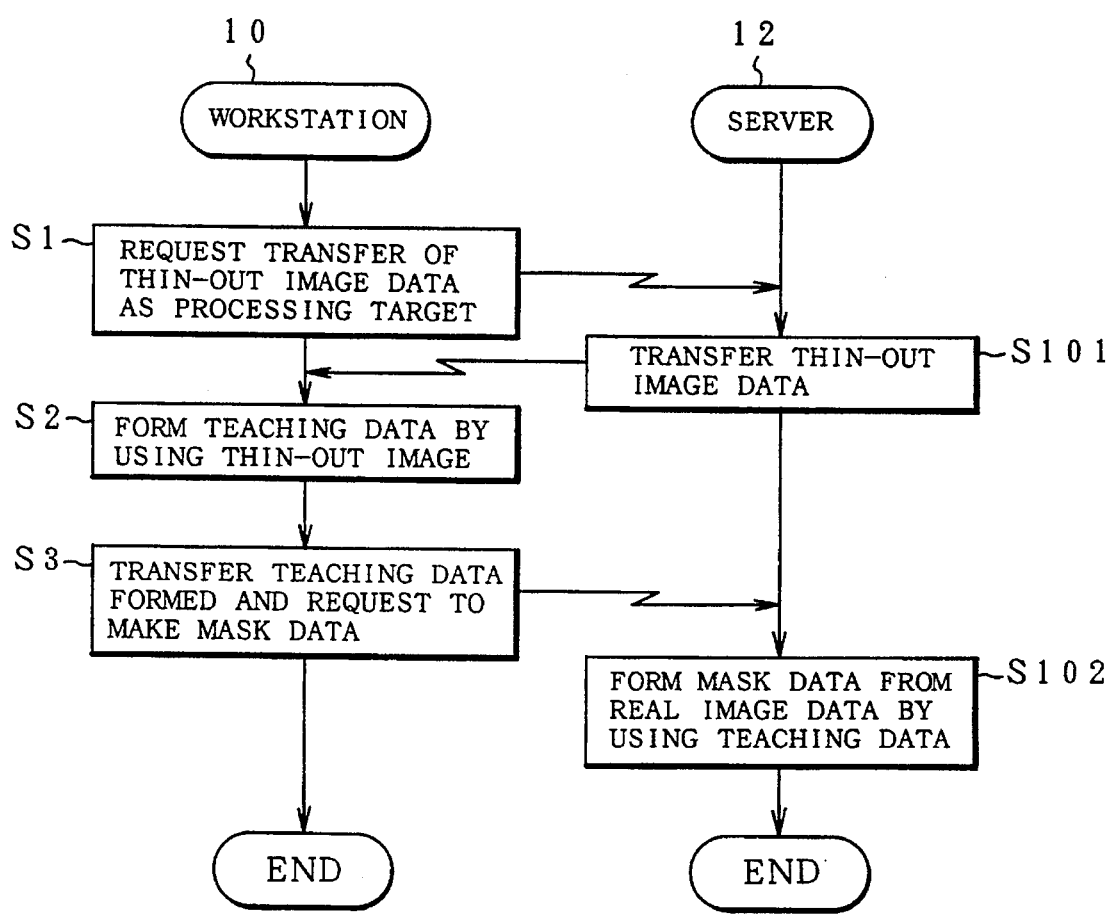
FIG. 4 is a flowchart for processes of a workstation and a server unit in FIG. 3.

FIG. 4 shows distributed image processes in the workstation 10 and server unit 12 in FIG. 3. First in step S1, the workstation 10 requests the server unit 12 to transfer the thin-out image data as a processing target. By receiving the transfer request, the server unit 12 reads out the thin-out image data from the data base 14 and transfers to the workstation 10 in step S101. When receiving the thin-out image data transferred from the server unit 12, the workstation 10 executes the process to form teaching data by using the thin-out image data stored in the internal memory 20 in step S2. When the teaching data is formed, it is transferred to the server unit 12 and the formation of the mask data is requested in step S3. By receiving the transferred teaching data and the request to form the mask data from the workstation 10, the server unit 12 forms the mask data from the real image data by using the teaching data as a guidance in step S102.

Figure 5:
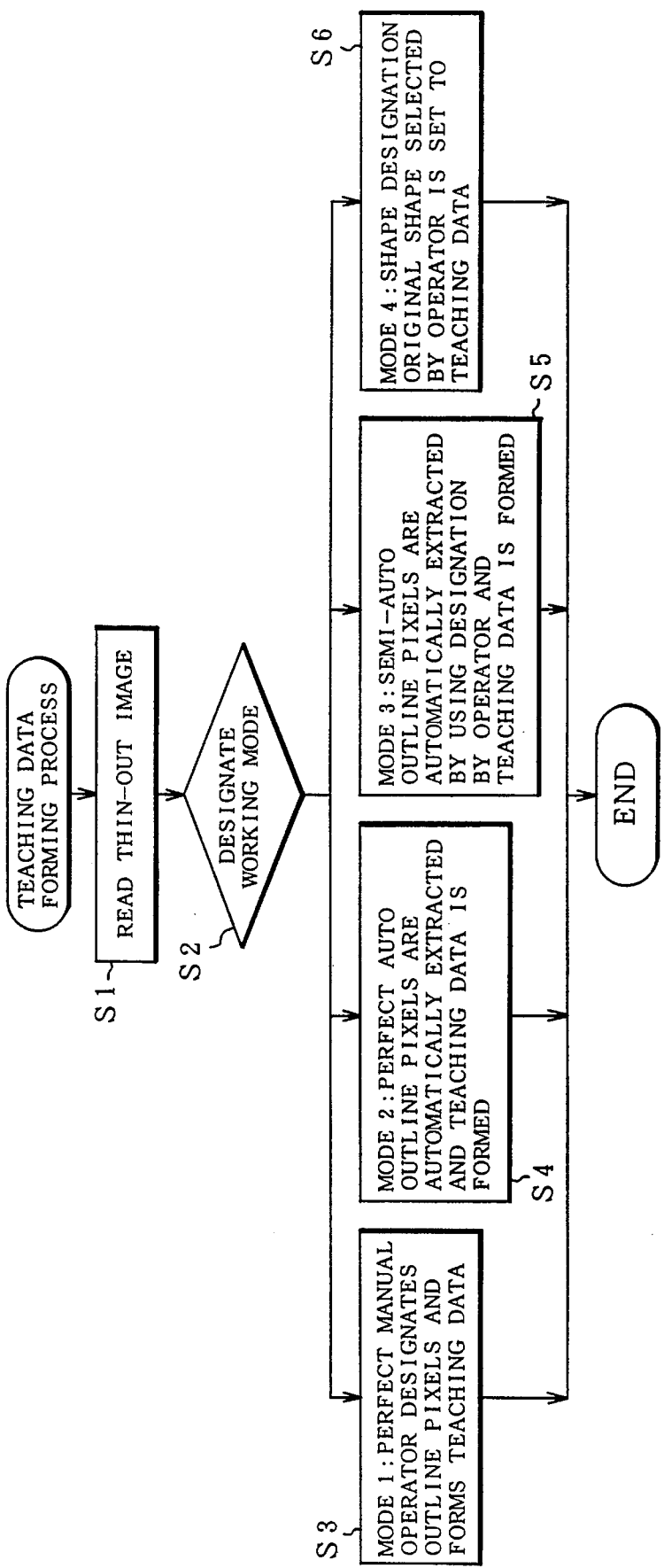
FIG. 5 is a flowchart for a forming process of guide teaching data by the workstation in FIG. 3.

FIG. 5 shows the details of the forming process of the teaching data using the thin-out image data in the workstation 10 shown in step S2 in FIG. 4. First in step S1, the thin-out image data is read out from the internal memory and is developed in the frame memory 26, thereby enabling the thin-out image to be displayed on the color display 28. In step S2, a check is made to see if a working mode has been designated or not. In the embodiment, either one of the mode-1 (perfect manual), the mode-2 (perfect auto), the mode-3 (semi-auto), and the mode-4 (shape designation) can be selected as a working mode.

When the operator selects the mode-1 (perfect manual), step S3 follows. The operator uses the mouse 22 or keyboard 24 and designates the outline pixels of the object to form the teaching data one pixel by one with respect to the thin-out image displayed on the color display 28 as a target, thereby forming the teaching data. In the case where the operator designates the mode-2 (perfect auto), step S4 follows. The outline pixels are automatically extracted and the teaching data is formed. As a method of automatically detecting the outline pixels, a method whereby a difference of the pixel values in the boundary portion is calculated and the position at which the difference peak value is obtained is set to an outline point or a color mixing method whereby a color mixture ratio within a range from 1 to 0 in the boundary region from an object color to a background color is calculated and, for example, the pixel of the color mixture ratio of 0.5 is set to the outline pixel is used. In the case where the operator designates the mode-3 (semi-auto), the outline pixels are automatically extracted by using the coarse designation of the outline by the operator, thereby forming teaching data. The formation of the teaching data using the coarse designation by the operator in the mode-3 (semi-auto) will be described in detail hereinlater with reference to FIGS. 9 to 30.

Further, when the operator selects the mode-4 (shape designation), step S6 follows and the original shape selected by the operator by using the color display 28 is set to the teaching data.

Figure 6:
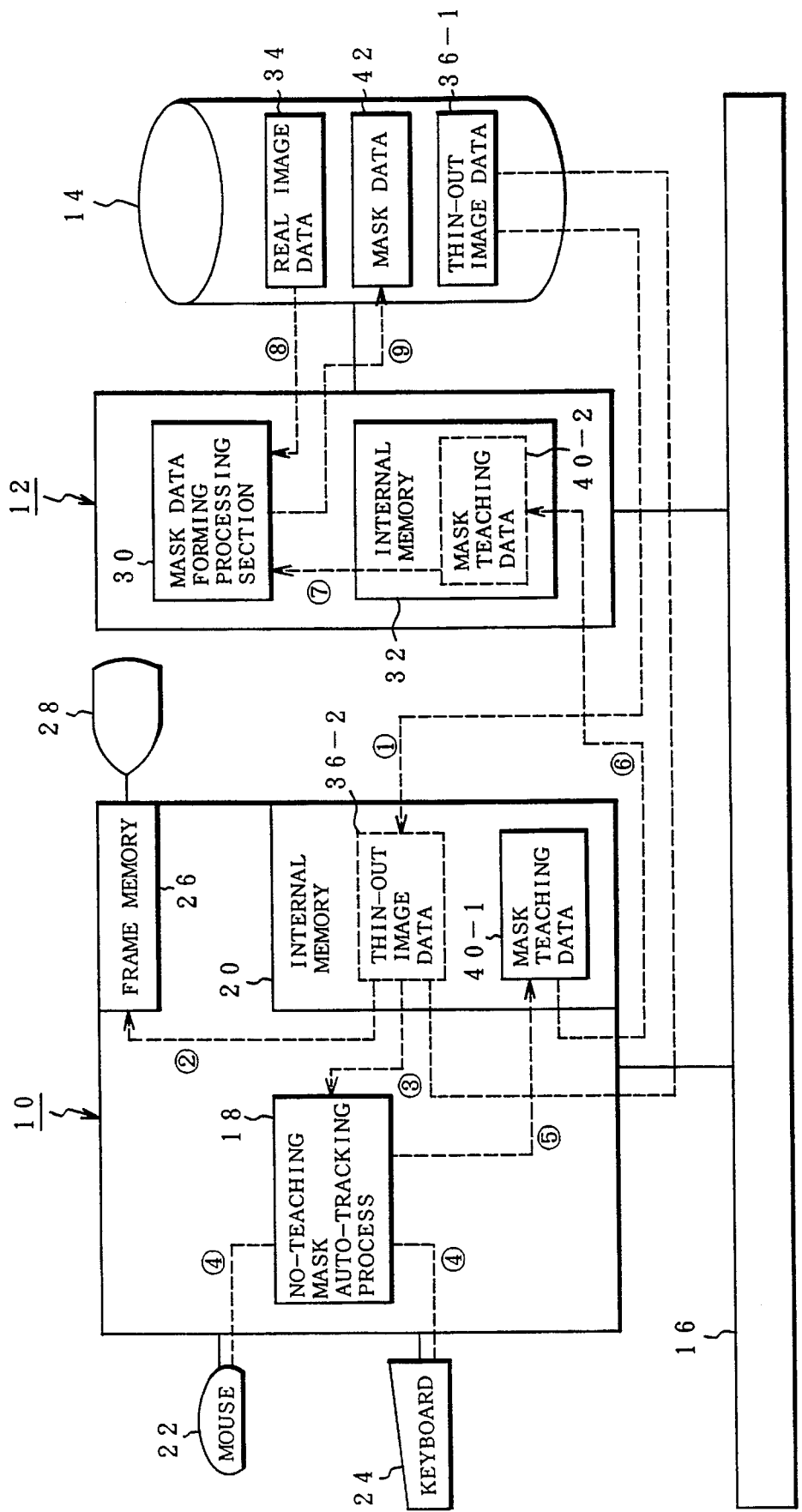
FIG. 6 is an explanatory diagram for a forming process of mask teaching data in a perfect auto mode in FIG. 5.

FIG. 6 shows the formation of the teaching data in the mode-2 (perfect auto) in FIG. 5 and the forming process of mask data by using the teaching data formed. The server unit 12 which received the transfer request from the workstation 10 on the basis of the instruction of the operator reads out the thin-out image data 36-1 from the data base 14 as shown in (1) and stores as thin-out image data 36-2 into the internal memory 20 of the workstation 10. The thin-out image data 36-2 is developed in the frame memory 26 and displayed on the color display 28. Subsequently, the teaching data forming processing section 18 is activated and automatically executes an outline tracking process to the thin-out image data 36-2 in the internal memory 20, thereby forming the mask teaching data. In this instance, the mask teaching data which is obtained in the automatic tracking processing step is displayed on the color display 28 in a real-time manner. The operator monitors the displayed data. When an abnormality occurs, the data is corrected by operating the mouse 22 or keyboard 24 by the operator as shown in (4). The mask teaching data 40-1 formed finally is stored into the internal memory 20 as shown in (5) and is further transferred to the internal memory 32 of the server unit 12 as shown in (6). The mask data forming processing section 30 of the server unit 12 which received the transferred mask teaching data 40-2 in the internal memory 32 reads out the mask teaching data 40-2 as shown in (7). At the same time, the mask data forming processing section 30 reads out the real image data 34 from the data base 14 as shown in (8) and forms the mask data 42 by the outline search of the real image data 34 by using the mask teaching data 40-2 as a guidance. The mask data 42 is stored into the data base 14 as shown in (2).

Figure 7:
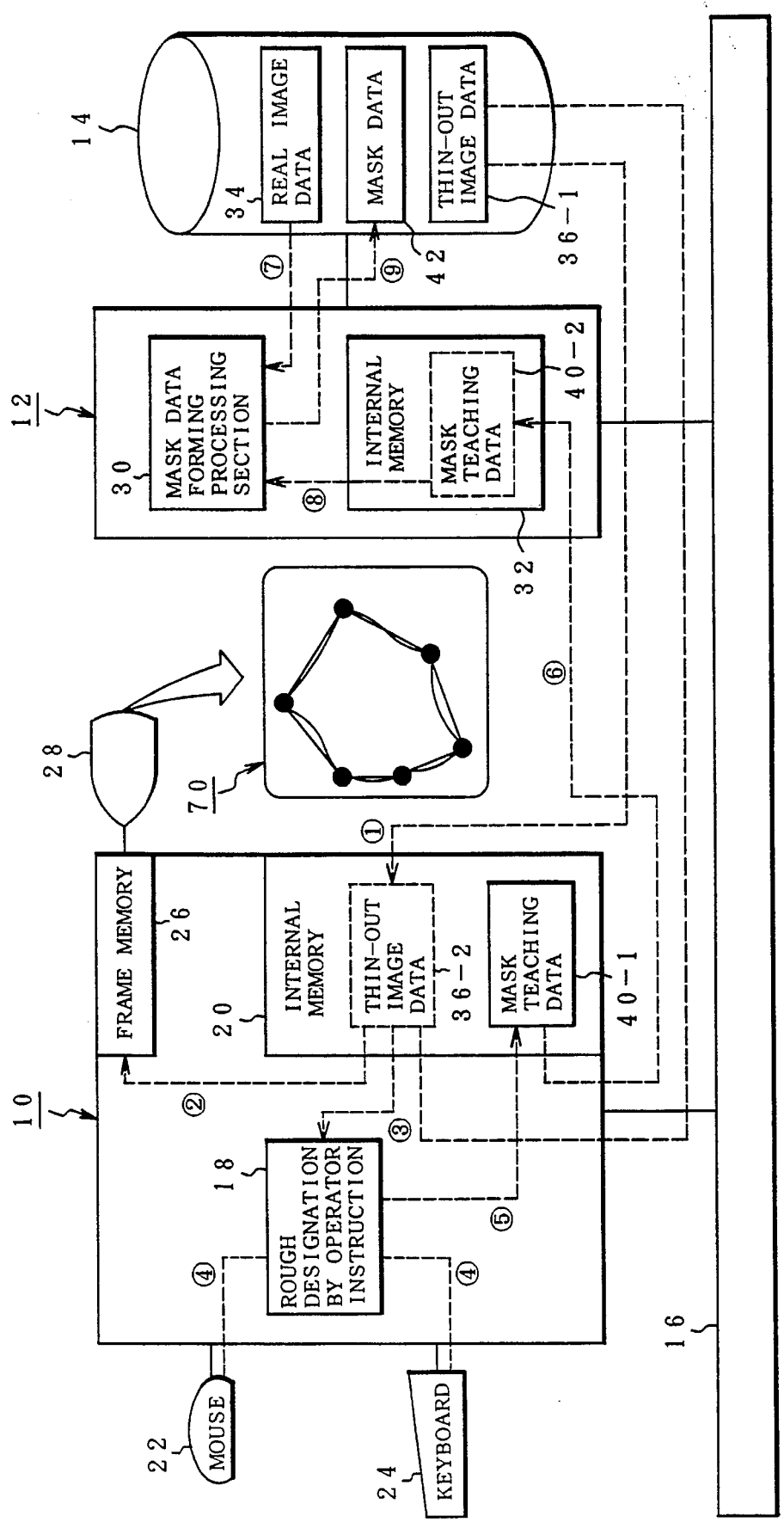
FIG. 7 is an explanatory diagram for a forming process of mask teaching data in a semi-auto mode in FIG. 5.

FIG. 7 shows a forming process of teaching data in the mode-3 (semi-auto) shown in FIG. 5. In the formation of the mask teaching data in the semi-auto mode, the thin-out image data transferred from the data base 14 to the internal memory 20 of the workstation 10 is developed in the frame memory 26. After that, the thin-out image data is displayed on the color display 28. In this state, the operator instructs the teaching data forming processing section 18 to perform the coarse designation of the outline by the mouse 22 or keyboard 24. For example, the operator designates points on the outline shown by black dots as shown in a monitor screen 70 of the color display 28. When the coarse designation by the operator is finished, the teaching data forming processing section 18 automatically searches the outline by using the information designated by the operator as a guidance, thereby forming the mask teaching data 40-1. The forming process of mask data in the server unit 12 after the mask teaching data 40-1 was formed is similar to that in case of FIG. 6.

FIG. 8 shows a forming process of teaching data by the shape designation in the mode-4 in FIG. 5. In place of the thin-out image data, original shape data 38-1 has been stored in the data base 14. The original shape data 38-1 in the data base 14 is transferred as original shape data 38-2 to the internal memory 20 in response to a request from the workstation 10 based on the instruction from the operator and is developed in the frame memory 26. The original shape data is displayed as shown in the monitor screen 70 of the color display 28. A plurality of original shape data 38-2 are prepared. The teaching data forming section 18 selectively displays different original shape data onto the color display 28 by the instruction from the operator. When the adaptive original shape is obtained by such a selective display of the original shape data, the operator designates the shape. The designated original shape data 38-2 is transferred to the server unit 12 and becomes the mask teaching data 40. The mask data forming processing section 30 of the server unit 12 uses the mask teaching data 40 as original shape data as a guidance and forms the mask image data 42 from the real image data 34 and stores into the data base 14.

In the embodiment of FIG. 8, only the original shape data 38-2 has been transferred to the workstation 10. However, to judge the adaptability with the image data on the color display 28, it is desirable to construct in a manner such that thin-out image data is previously prepared in the data base 14 and is sent to the workstation 10 together with the original shape data and the original shape data is selectively overlapped to the thin-out image on the color display 28 and the resultant overlapped data is displayed, thereby making it possible to select the original shape data that is most adapted to the target object in the thin-out image to form the mask pattern. Further, by providing a coordinates converting function for changing a reduction ratio or position of the original shape data for the workstation 10, the original shape data for the target object can be also dynamically set.

Forming Process of Mask Teaching Data in Semi-auto Mode

A flowchart of FIG. 9 shows a forming process of the mask teaching data in the semi-auto mode using the designation from the operator in FIG. 5. First in step S1, for a display image based on the thin-out image data of the monitor screen, a position near the outline of the object as an outline detecting target is instructed. In this instance, such a position is designated by the operator by using the mouse or the like or by automatically detecting the position near the outline. As a method of automatically detecting the position near the outline, for example, in case of continuously detecting the same object in a plurality of images such as an outline of an automobile, the position near the outline is designated by using knowledge as a car, specifically speaking, the shape or position or the like in the figure. Subsequently, as shown in step S2, on the basis of the position designated in step S1, the boundary point between the object near the designated position and the background is detected. In step S3, on the basis of the boundary point detected, all of the boundary points around the object are detected, thereby forming the mask teaching data constructed by the boundary points over the whole periphery.

Figure 10A:
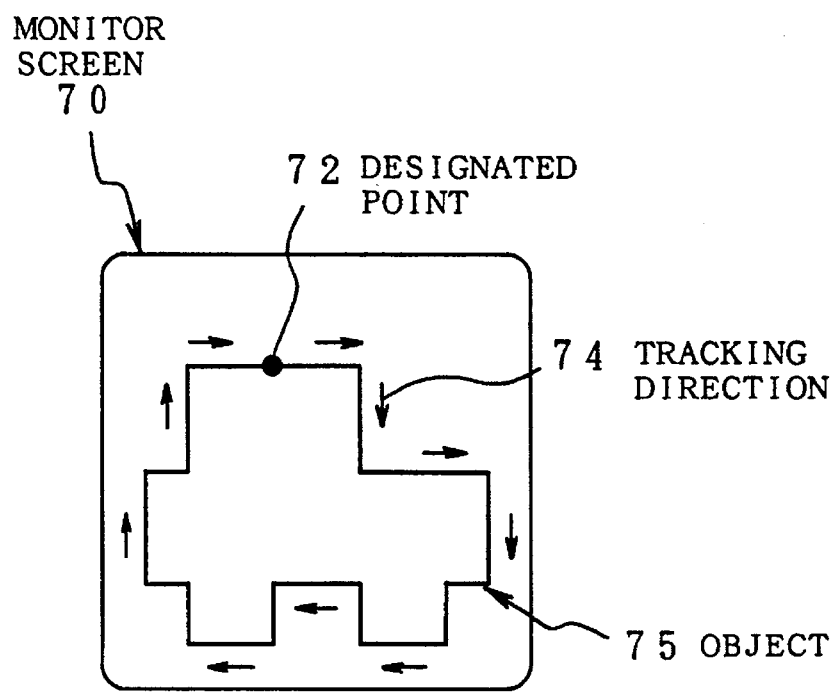
FIGS. 10A and 10B are explanatory diagrams for a designating method of an outline detection target object.
Figure 10B:
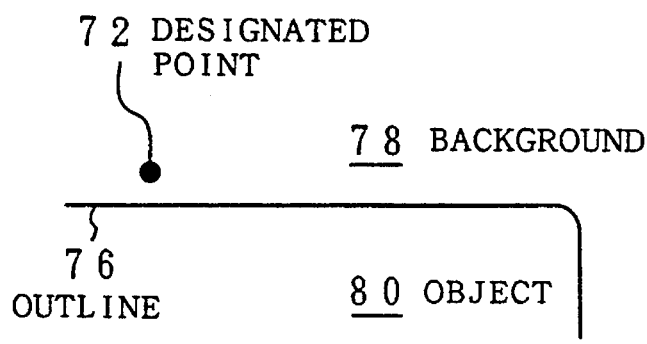

FIG. 10A shows a method of designating the position near the outline of the target object in step S1 in FIG. 9. An automobile 75 is displayed on the monitor screen 70 as an object as an outline detecting target. When detecting the outline of the object 75, the outline portion of the object 75 is designated as a designated point 72. In the designation of the outline, there is no need to strictly designate the point on the outline. As shown in FIG. 10B, it is sufficient to coarsely designate a location near an outline 76 as a designated point 72. The strict boundary point on the outline is detected in the processing step S2 in FIG. 9. In FIG. 10B, although the designated point 72 exists in a region of a background 78 on the outside of the outline 76, it can also exist in a region of an object 80 on the inside of the outline 76. As a designating method of the designated point 72 for the outline 76, in a state in which the image as a detecting target is displayed on the monitor screen 70, the operator designates at least one location on the image as an outline detecting target by using the mouse, light pen, or digitizer.

Figure 11:
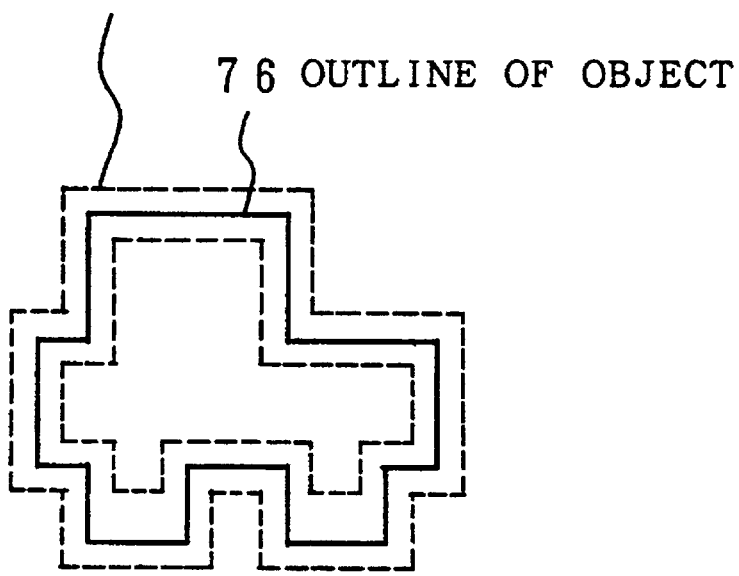
FIG. 11 is an explanatory diagram for another designating method of the outline detection target object.

FIG. 11 shows another designating method of the outline detecting target object in step S1 in FIG. 9 and is characterized in that a region is designated for the point designation in FIG. 10. In a state in which the object as an outline detecting target is displayed on the monitor screen, the operator traces the object outline 76 by the mouse or the like and sets the peripheral region including the object outline 76 into a designated boundary region 82. The strict detection of the object outline 76 based on the setting of the designated boundary region 82 is executed by the boundary detecting process in step S2 in FIG. 9. As shown in FIGS. 10 and 11, since the operator doesn't need to strictly designate the outline of the object to be detected, the working burden is small.

First Embodiment of Boundary Point Detecting Process

Figure 12:
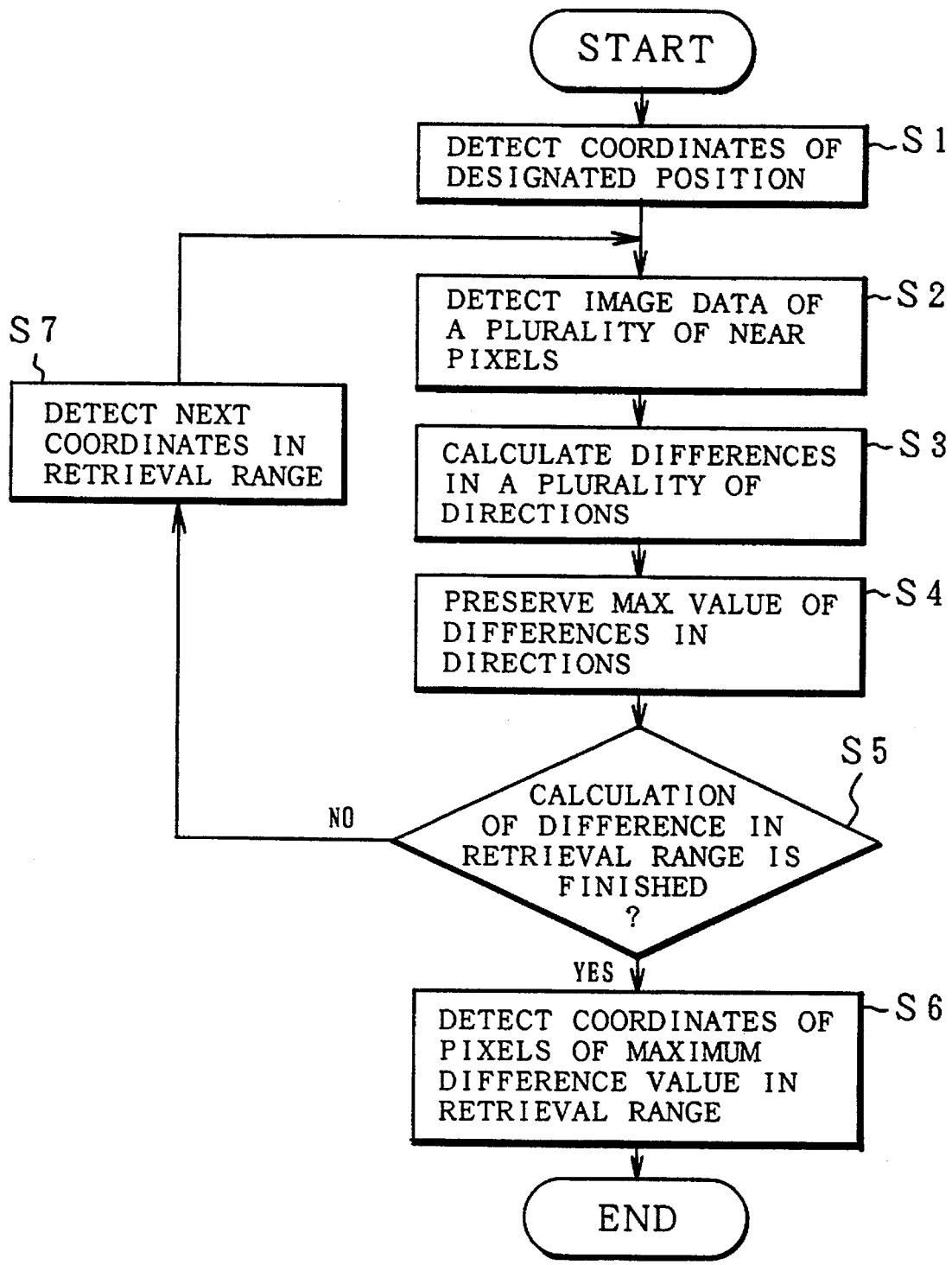
FIG. 12 is a flowchart for the first embodiment of a boundary detecting process in FIG. 9.
Figure 13:
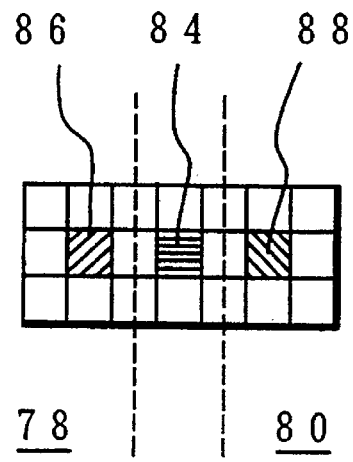
FIG. 13 is an explanatory diagram for detection of differences between a boundary pixel and the detection pixels in the right and left directions.
Figure 14:
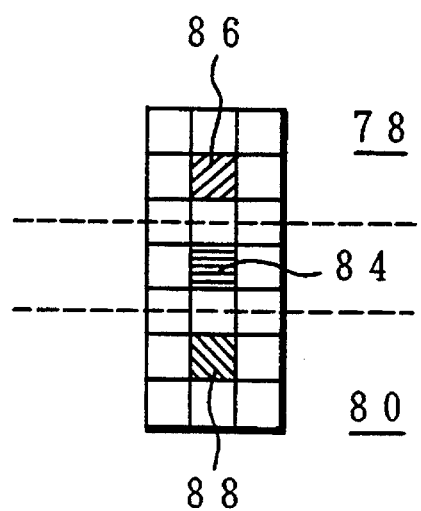
FIG. 14 is an explanatory diagram for detection of differences between the boundary pixel and the detection pixels in the vertical direction.

A flowchart of FIG. 12 shows the first embodiment of the boundary detecting process which is executed in step S2 in FIG. 9. First in step S1, the coordinates of the position designated by the operator are detected. In step S2, image data of a plurality of near pixels is obtained. FIG. 13 shows a state of a plurality of near pixels which are detected on the basis of the designated pixel. For a boundary pixel 84 as a target pixel which is at present a processing target, data of detection pixels 86 and 88 each of which is away from the boundary pixel 84 by one pixel in the main scan direction (horizontal direction) is detected. In FIG. 14, for the boundary pixel 84 as a target pixel, the pixels at the positions each of which is away from the boundary pixel 84 by one or more pixels in the sub scan direction (vertical direction) are set to the detection pixels 86 and 88. Further as shown in FIG. 15, with respect to the oblique direction as well, the detection pixels 86 and 88 existing at the positions each of which is away from the boundary pixel 84 as a target pixel by one or more pixels are obtained.

Figure 15:
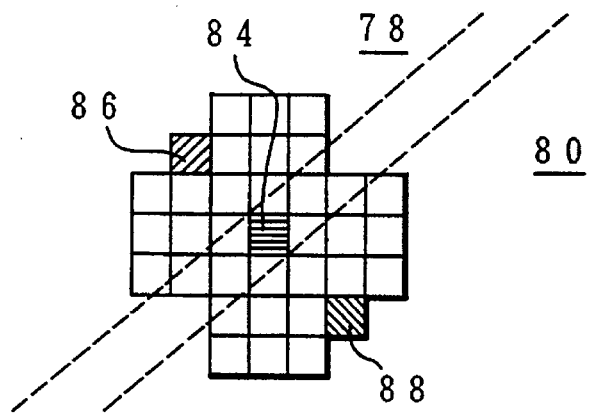
FIG. 15 is an explanatory diagram for detection of differences between the boundary pixel and the detection pixels in the oblique direction.

As shown in FIGS. 13, 14, and 15, when the pixel data at the position that is away from the boundary pixel 84 as a target pixel by one or more pixels in each of the right, left, upper, lower, and oblique directions is detected as detection pixels, the processing routine advances to step S3 in FIG. 12. A difference between the pixel data regarding each direction is calculated. Subsequently in step S4, the maximum value among the differences calculated with respect to a plurality of directions is preserved. In case of using color data as image data, the difference in each direction is calculated by using either one of the color components (R, G, B), (Y, U, V), or the like and the maximum value among them is preserved. It is also possible to calculate the difference every color component of R, G, B, Y, U, V, etc. and to preserve the maximum value among the calculated differences. The method of calculating the differences for all of the color components and preserving the maximum value among them can also cope with every change in color and every change in brightness although the calculation amount is large. The outline detecting precision can be also improved. As shown in FIGS. 13, 14, and 15, by calculating the differences in the lateral, vertical, and oblique directions, the invention can also cope with the boundary existing in every direction.

When the maximum value among the differences in a plurality of directions is preserved in step S4 in FIG. 12, a check is made to see if the processes in steps S2 to S4 have been finished or not with respect to all of the pixels in the retrieval range which has previously been designated in step S5. If NO, the processing routine is returned to step S7 and the next coordinates in the retrieval range are detected. The processes from step S2 are repeated. When all of the difference calculations in the retrieval range are finished in step S5, step S6 follows and the coordinates having the maximum value among the differences preserved for the pixels in the retrieval range are detected as a boundary point.

Figure 16:
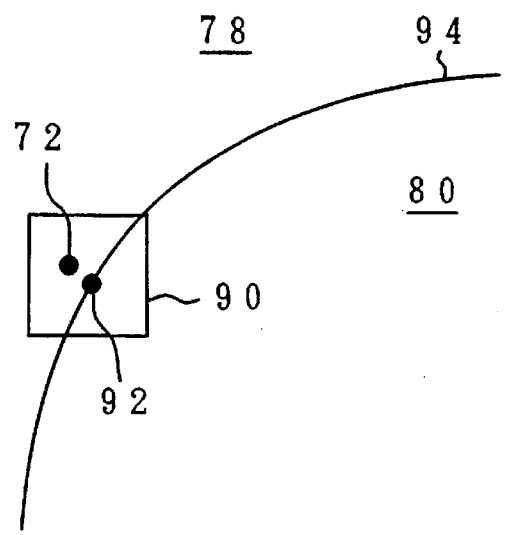
FIG. 16 is an explanatory diagram for peripheral search based on a designated point.

FIG. 16 shows the relations among the designated point by the operator, the retrieval range, and the detected boundary point. That is, when the operator instructs the designated point 72 near a boundary 94 between the object 80 and the background 78, for example, a rectangular retrieval range 90 is set around the designated point 72 as a center. With respect to all of the pixels existing in the retrieval range 90, the processes in steps S2 to S4 in FIG. 12 are repeated and a boundary point 92 is finally detected.

Figure 17A:
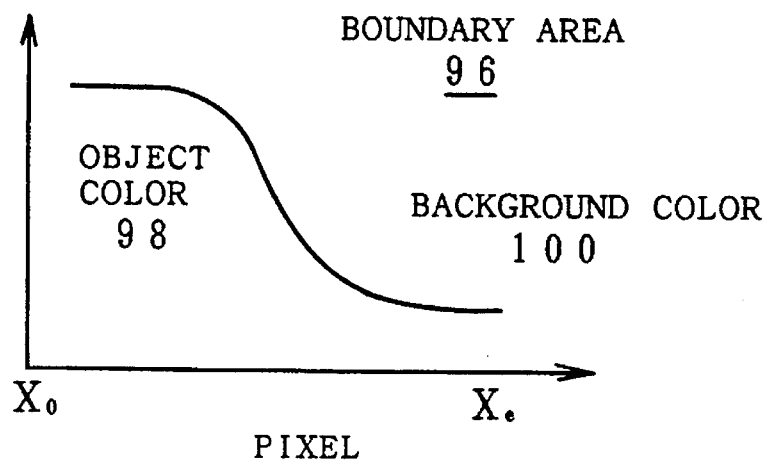
FIGS. 17A and 17B are explanatory diagrams for boundary judgment based on a difference of pixels.
Figure 17B:
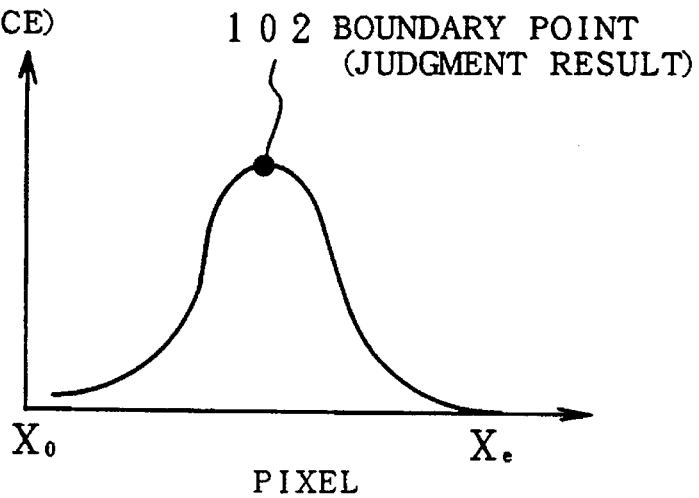

FIGS. 17A and 17B show a state of a change in image data in the boundary region, a state of the change in difference, and a state of the boundary judgment. As shown in FIG. 17A, in a boundary region 96, the color of the image data smoothly changes from an object color 98 to a background color 100. Such a smooth color change in the boundary region 96 depends on a blur of the lens of a camera, an image scanner, or the like when the image is inputted. As for the comparison of the differences in the retrieval range, a difference is sequentially obtained with respect to each pixel from a pixel $X_0$ to a pixel $X_e$ in the boundary region and the result is plotted as shown in FIG. 17B. For a distribution state of the differences in the boundary region as shown in FIG. 17B, the pixel of the maximum difference is judged as a boundary point 102. From the data of the pixels in FIG. 17A, in the calculation of the difference in FIG. 17B, as shown in FIGS. 13, 14, and 15, the pixels each of which is away from the boundary pixel 84 as a judgment target by one pixel is calculated as detection pixels 86 and 88. Although the pixels adjacent to the boundary pixel 84 can be also set to the detection pixels, the pixels which are away from the boundary pixel by about one pixel are difficult to be influenced by the noises and a change in color can be easily detected rather than the pixels adjacent to the boundary pixels on both sides.

Figure 18:
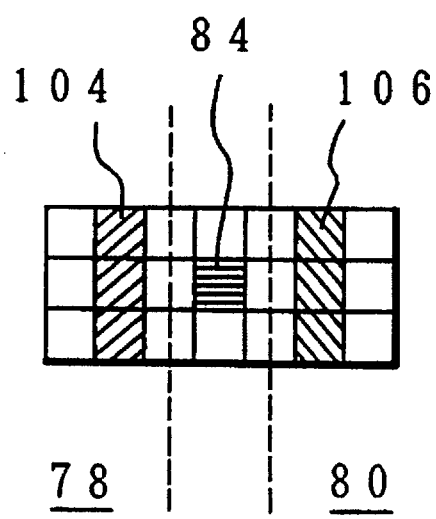
FIG. 18 is an explanatory diagram for detection of a difference between the boundary pixels and the average of a plurality of peripheral pixels.

FIG. 18 shows another embodiment for obtaining image data of the pixels near the designated point instructed by the operator in step S2 in FIG. 12. As a method of obtaining the image data of the pixels near the designated point according to the embodiment, for example, in case of detecting in the horizontal direction, detection data 104 and 106 are obtained as averages of three pixels arranged in the vertical direction and exist on the left and right sides of the boundary pixel 84 which are away from the boundary pixel by one pixel, respectively. Differences between the image data of the boundary pixel 84 and the detection data obtained as averages of three pixels on both sides are calculated. By using the image data of the averages of respective three pixels as detection pixels, the influence by the noises included in the image can be reduced and the boundary can be detected at a higher precision. In FIG. 18, the averages of the detection pixels locating in the left and right directions as a means can direction are calculated. However, with respect to the sub scan direction (vertical direction) in FIG. 14 and the oblique direction in FIG. 15, the averages of the respective three pixels can be also used as detection data. Further, in FIG. 18, although the averages of three pixels have been obtained, by further increasing the number of pixels which are used for calculation of the averages, the influence by the noises can be further reduced.

Second Embodiment of Boundary Point Detecting Process

Figure 19:
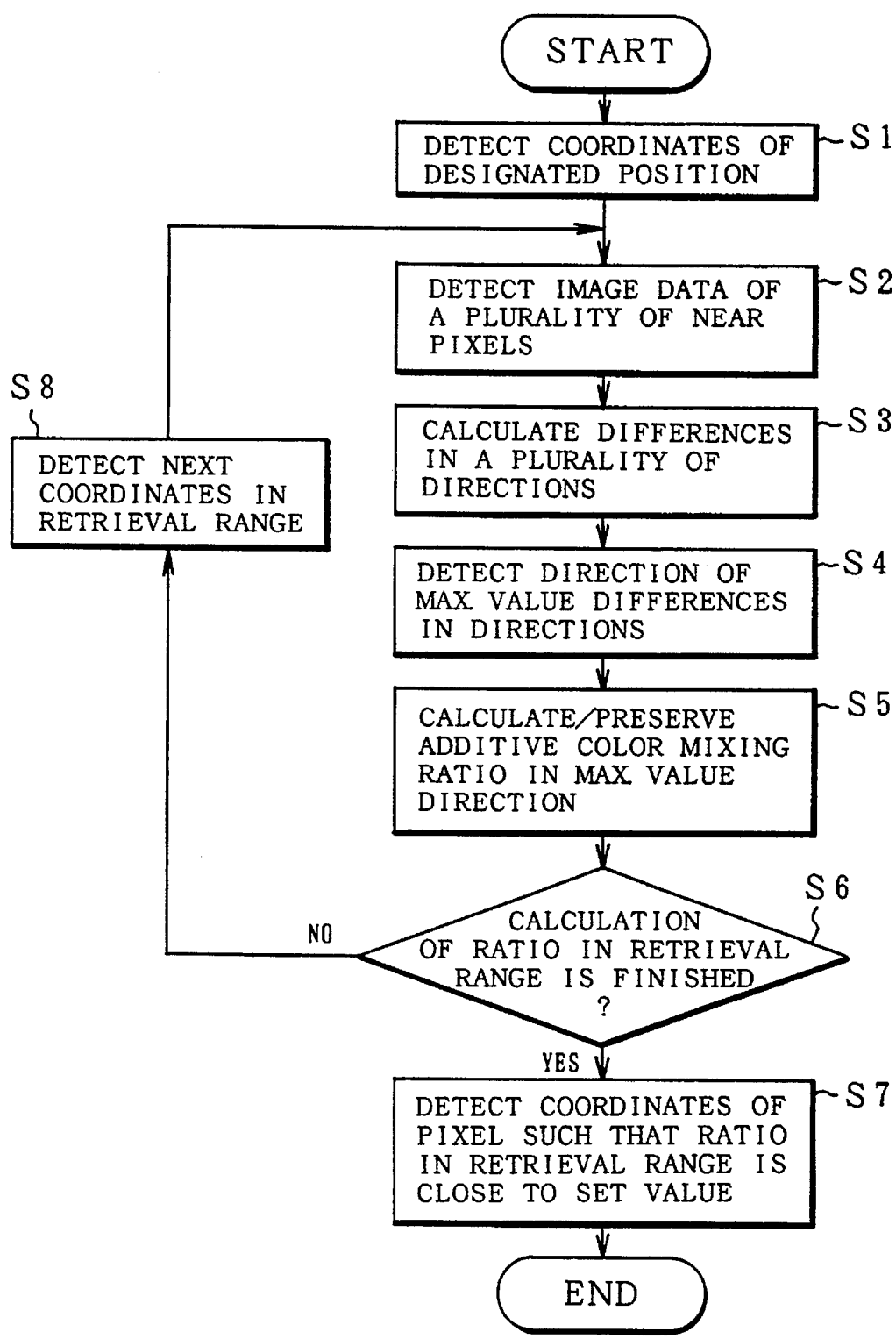
FIG. 19 is a flowchart for the second embodiment of a boundary detection in FIG. 9.

A flowchart of FIG. 19 shows the second embodiment of the boundary detection in step S2 in FIG. 9. The second embodiment of the boundary detection is characterized in that the boundary is detected by using a ratio of an additive color mixture of the object color and background color in the boundary region.

In FIG. 19, first in step S1, the coordinates of the designated position indicated by the operator are detected. In step S2, in a manner similar to the first embodiment of FIG. 12, the image data of the near pixels around the target boundary pixel is detected. In step S3, the differences between the boundary pixels in a plurality of directions and the detection pixel are calculated. In step S4, the direction of the maximum value among the differences in a plurality of directions is detected. In step S5, the image data of the boundary pixel is expressed by the additive color mixture by using two image data of the object color on the object side and the background color on the background side. The color mixture ratio is further obtained and preserved every pixel. As for the processes in steps S2 to S5, until the calculation of the ratio is finished with respect to all of the pixels in the retrieval range in step S6, the next representative pixel in the retrieval range is detected in step S8 and the similar processes are repeated. When the calculating processes of the ratios of all of the pixels in the retrieval range are finished, the processing routine advances to step S7 and the pixel having a preset ratio, for example, a ratio of the additive color mixture that is closest to 0.5 is detected as a boundary pixel.

Figure 20:
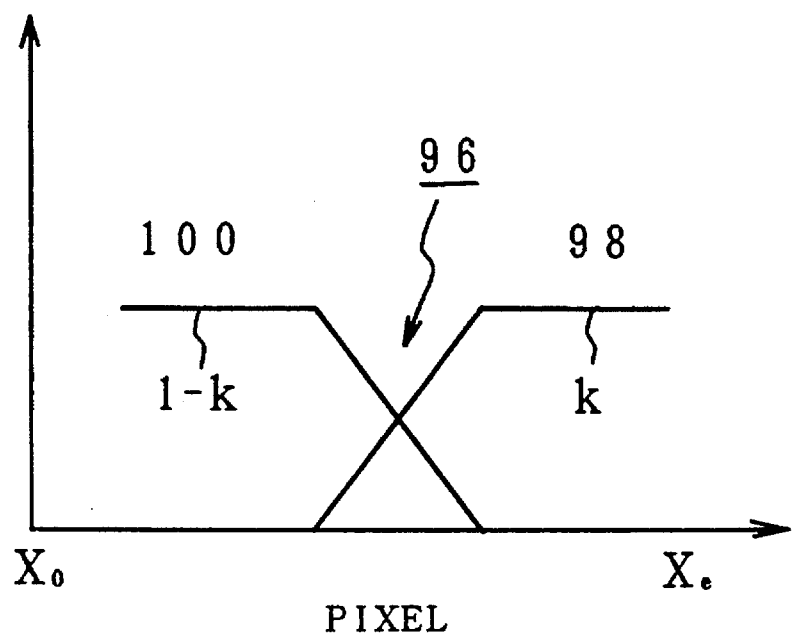
FIG. 20 is an explanatory diagram of a color mixture ratio in the boundary portion of an object color and a background color.

FIG. 20 shows a model of the additive color mixture of the object color and background color as processing targets in the second embodiment of the boundary detection of FIG. 19. Namely, at the boundary 96 in which the color changes from the object color to the background color, the color of the object and the color of the background are mixed. When a degree of mixture of the colors in the boundary portion is modeled by setting a ratio of the object color to (k) (k=0~1), the object color mixture ratio 98 linearly decreases from (k=1) to (k=0) as the pixel approaches the background side from the boundary 96. On the other hand, the background color mixture ratio 100 shown by (1−k) linearly increases from (1−k)=0 to (1−k)=1 as the pixel approaches the background side from the object side. Therefore, the relation in the boundary region is expressed by the following equation.

boundary color=($k$)×(object color)+(1−$K$)×(background color)

In such a modeling of the color mixture ratio, the color mixture ratio (k=0.5) denotes the center, namely, the boundary 94 of the color mixture region in which the object color and the background color are mixed by a similar degree. Therefore, with respect to the value of the color mixture ratio obtained with respect to the pixels arranged from the background side to the object side, the pixel whose color mixture ratio is closest to the set ratio 0.5 is detected as a boundary pixel, so that the object outline can be detected.

First Embodiment of Mask Teaching Data Forming Process by Outline Detecting Process When the boundary point can be detected from the point designated by the operator, by searching and tracking the periphery of the object on the basis of the detected boundary point, the object outline is detected and set to the mask teaching data. As a procedure to detect the object outline, namely, a method of successively executing the boundary judgment, it is necessary to select and use a different method in dependence on the feature of the image.

The feature of the image can be classified as follows.

I. The background is uniform and the outline is clear.

II. The background is complicated and the outline is obscure.

III. It is difficult to know the boundary between the object and the background due to a shadow or the like.

In the invention, the optimum object outline detecting method is determined in accordance with the features of the image as shown in the above items (I) to (III). The optimum method is selected and the object outline is detected.

Figure 21:
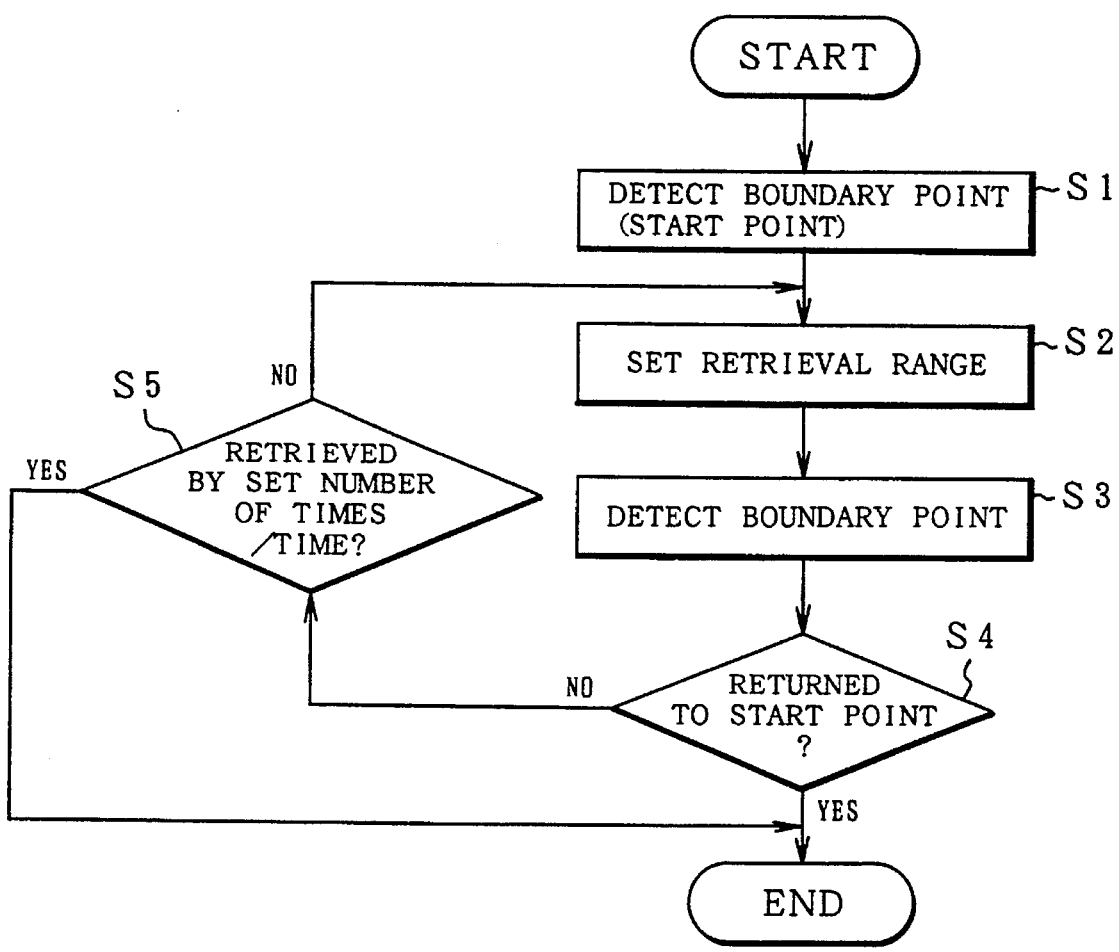
FIG. 21 is a flowchart in the first embodiment of a mask teaching data forming process by an outline detection in FIG. 9.

A flowchart of FIG. 21 shows the first embodiment of the forming process of the mask teaching data by the outline detection of the invention. The object outline is traced on the basis of the boundary point obtained by the boundary detecting process in FIG. 12 or 19. First in step S1, the boundary point is obtained and is set to a start point to trace the object outline. In step S2, a predetermined retrieval range is set around the boundary point. With respect to the retrieval range, a new boundary point is detected by applying the same method as the first embodiment of the boundary detecting process in FIG. 12 or the second embodiment of the boundary detecting process in FIG. 19. In step S4, a check is made to see if the boundary point has been returned to the start point or not. The processes for setting the retrieval range and detecting the boundary point in steps S2 and S3 are repeated until the boundary point is returned to the start point. When the processing routine is returned from step S4 to step S2, a check is made in step S5 to see if the number of executing times of the outline detecting process for the setting of the retrieval range and the detection of the boundary point has reached a predetermined number of times or not or a check is made to see if the boundary point has been searched for a predetermined time or not. If YES, the processing routine is forcedly finished even if the boundary point is not returned to the start point.

Figure 22:
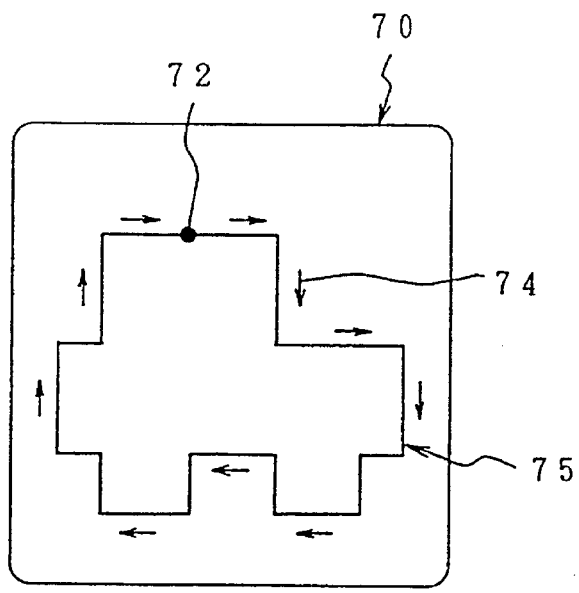
FIG. 22 is an explanatory diagram for outline tracking based on a designated point.

FIG. 22 shows a state of the outline detecting process in FIG. 21. The designated point 72 is first set as a start point. The setting of the retrieval range along the outline of the automobile 75 as an outline detection target as shown by arrows as a tracking direction 74 and the detection of the boundary point are repeated. When the boundary point is returned to the designated point 72 set as a start point, the series of boundary detecting processes are finished.

Figure 23B:
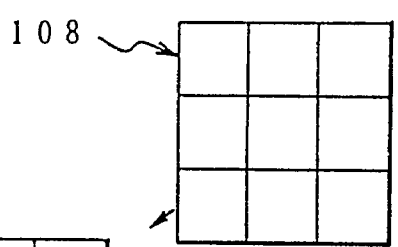
FIG. 23 is an explanatory diagram for a retrieval range that is set by the outline tracking.
Figure 23A:
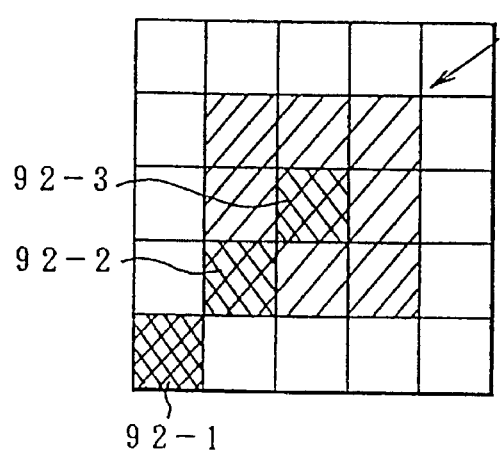

FIG. 23 shows a method of setting the next retrieval range after one outline point was detected in the outline detecting process in FIG. 21. By the setting of the retrieval range and the detection of the boundary point, outline pixels 92-1, 92-2, and 92-3 are sequentially detected. Subsequently, the outline pixel 92-3 is used as a detection point and the retrieval range is set. As a retrieval range, the central pixel of a reference mask 108 of total nine (3×3) pixels extracted at the right upper position of the drawing is set to the outline pixel 92-3. The next outline pixel is selected from the eight peripheral pixels shown by hatched portions. Since the processes have already been finished with respect to the outline pixel 92-2 at the left lower corner, the pixel 92-2 is eliminated. The outline pixels are selected from the remaining seven pixels. As a method of selecting the outline pixels, with regard to the remaining seven pixels excluding the outline pixel 92-2 in which the processes have already been finished and which exist around the outline pixel 92-3, each pixel is presumed as a boundary pixel. The differences and color mixture ratios are obtained by the outline detecting process in FIG. 12 or 19. The pixel having the largest difference or the pixel whose color mixture ratio is closest to the set value 0.5 is detected as a new outline pixel indicative of the boundary. FIG. 23 shows the case where eight peripheral pixels of the outline pixel have been set to the retrieval range, four right, left, upper, and lower pixels can be also set to a retrieval range.

In step S5 in FIG. 21, the reason why the tracking process is forcedly finished when the number of processing times reaches the set number of times or the processing time has reached the set time is because it is considered a case where the searching process of the outline detection enters an infinite loop and the processing routine is not finished or where the boundary point reaches the edge portion of the image as a result of the tracking and the processing routine is not finished. In the outline tracking of FIG. 22, with respect to the process of the branch portion in which the outline intersects, the designated point 72 is not set to one point as shown in the diagram but is designated to a plurality of points, thereby enabling all of the outline points including the branch of the outline to be searched. In case of setting the designated point 72 to one point, since at least two outline pixels are obtained in the branch portion, they are preserved as a first candidate and a second candidate. The tracking process is first executed with respect to the outline pixel of the first candidate. When returning to the tracking start point, the tracking process is executed from the remaining second candidate.

Second Embodiment of Mask Teaching Data Forming Process by Outline Detection

Figure 24:
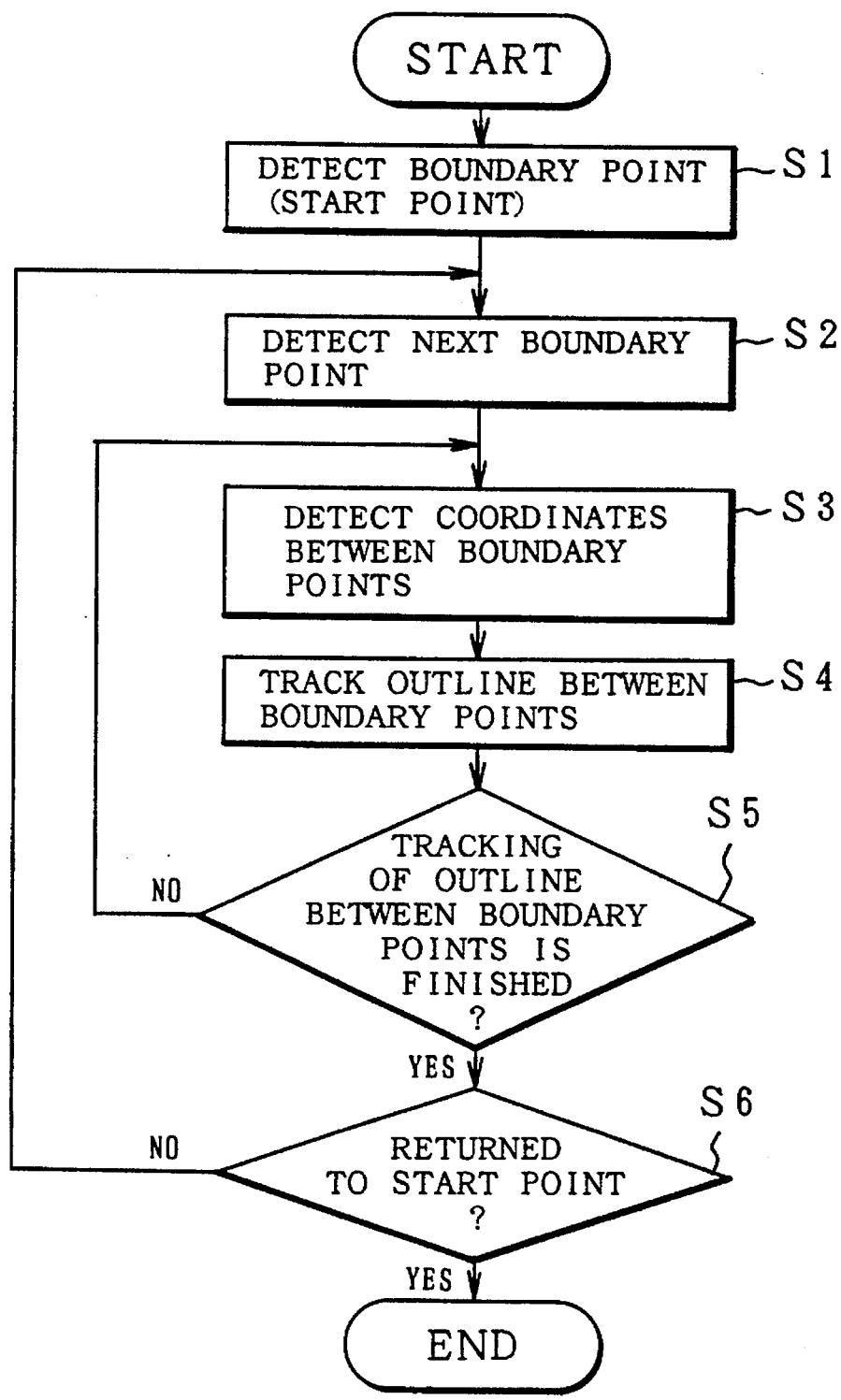
FIG. 24 is a flowchart in the second embodiment of the mask teaching data forming process by the outline detection in FIG. 9.

A flowchart of FIG. 24 shows the second embodiment of the forming process of the mask teaching data by the outline detection in step S3 in FIG. 9. The second embodiment is characterized in that the object outline is tracked on the basis of the designation of a plurality of boundary points. Prior to the second embodiment of the outline detecting process in FIG. 24, the operator previously instructs a plurality of designated points along the outline of an image as an outline detection target of the monitor screen.

Figure 25:
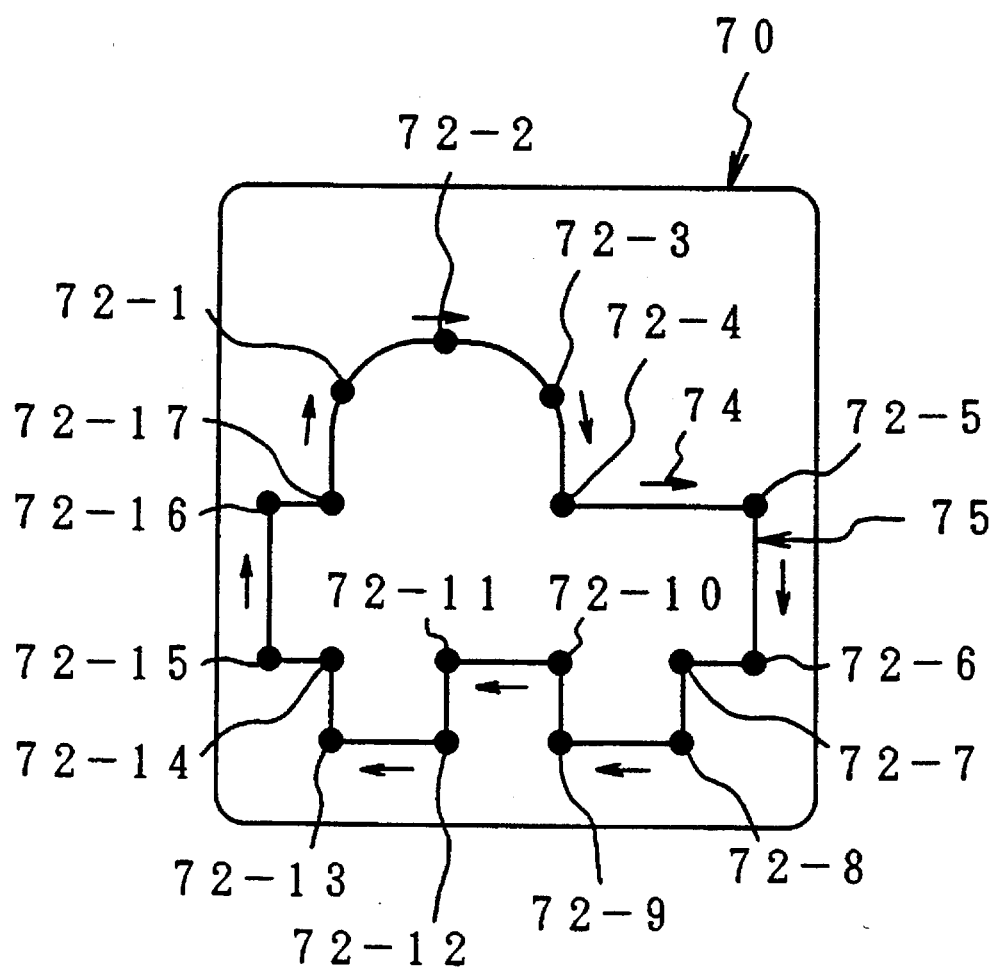
FIG. 25 is an explanatory diagram for the outline tracking by the designation of a plurality of points.

In such a state in which a plurality of designated points are indicated, first in step S1, with respect to a specific designated point, the boundary point is obtained by the method of FIG. 12 or 19 and is set to a start point. In step S2, the boundary point is similarly detected from the next designated point. In step S3, a straight line connecting two boundary points is presumed. Each of the coordinates points obtained by equally dividing the straight lines is considered as a designated point. With respect to the instructed points set on the straight line, the boundary point is detected by the method of FIG. 12 or 19 and the outline is tracked in step S4. When the outline tracking between two points is finished in step S5, a check is made in step S6 to see if the boundary point has been returned to the start point or not. If NO, the previous boundary point is set to the new start point and the processes in steps S2 to S5 are repeated. When returning to the start point, the series of processes are finished. The second embodiment of the outline detecting process in FIG. 24 relates to a method that is effective to an image such that the outline cannot be preferably detected by the outline tracking based on the start point of only one point by the operator. Specifically speaking, with respect to an image such that the boundary is obscure because of a complicated background or an image such that the background and the boundary are difficult to be distinguished in the shadow portion of the object, the accurate outline of the object can be detected by using the designation of a plurality of points by the operator as an assistance. When designating a plurality of points by the operator, it is obviously sufficient to coarsely designate the points near the boundary of the object. The accurate boundary is detected by executing the method of FIG. 12 or 19 by the computer. Therefore, even when a plurality of points are designated, a burden on the operator is very small and any special experience is also unnecessary. FIG. 25 shows the method of instructing a plurality of designated points by the operator in the outline detecting process in FIG. 24. The operator indicates designated points 72-1 to 72-17 along the outline of the object on the monitor screen 70. Since the designated point 72-1 has first been designated, it is set to the start point and the designated point 72-17 is set to the last designated point.

Figure 26:
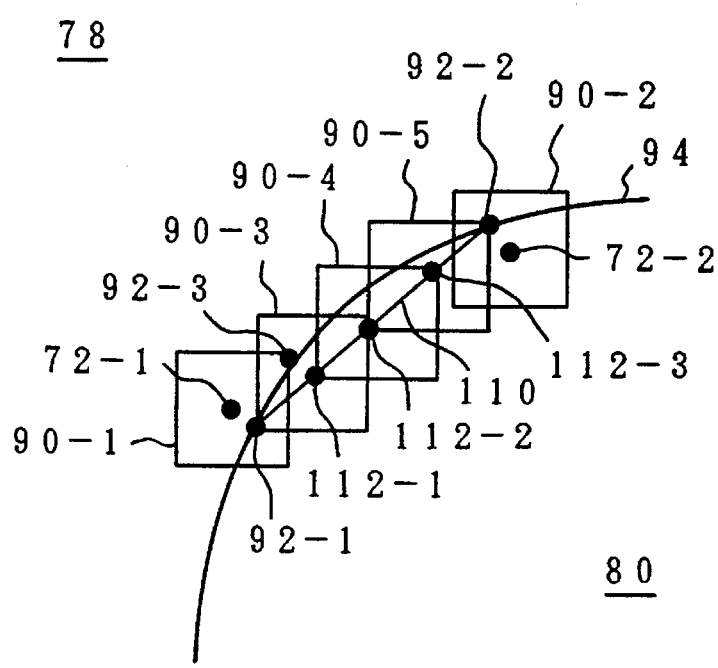
FIG. 26 is a detailed explanatory diagram for the outline tracking between two designated points in FIG. 25.

FIG. 26 shows an outline tracking process between the two designated points 72-1 and 72-2 in FIG. 25. First, a retrieval range 90-1 is set on the basis of the designated point 72-1 and the boundary pixel (boundary point) 92-1 as a start point is detected. A retrieval range 90-2 is set with respect to the designated point 72-2 which was designated at the second time and the boundary pixel (boundary point) 92-2 is detected. Subsequently, an equation of a straight line 110 connecting the two detected boundary pixels 92-1 and 92-2 is obtained. The X coordinate is increased one by one from the boundary pixel 92-1 which was detected before and the Y coordinate on the straight line 110 is obtained. A new designated point 112-1 is set on the straight line 110 by the coordinate values (X, Y) obtained. Similarly, designated points 112-2 and 112-3 are set on the straight line 110 until the boundary pixel 92-2. With respect to the first designated point 112-1 on the straight line 110, a retrieval range 90-3 is set and the boundary pixel (boundary point) 92-3 is detected by the method of FIG. 12 or 19. In a manner similar to the above, retrieval ranges 90-4 and 90-5 are set with regard to the designated points 112-2 and 112-3 on the straight line 110 and the boundary pixels are sequentially detected. In the process of FIG. 26, the X coordinate is increased one by one with respect to the straight line 110 and the designated points 112-1, 112-2, . . . are set. However, when an inclination of the straight line is large, the Y coordinate is increased one by one instead of the X coordinate. The X coordinate is obtained from the equation of the straight line and the designated point is sequentially set. In the above description, the straight line has been obtained on the basis of the boundary pixels of two points and the boundary pixel between two points has been detected. However, it is also possible to obtain a curve on the basis of the boundary pixels of three or more points and to obtain the boundary pixel between one point to another point on the curve. In this case, the number of points which are designated can be reduced and the burden on the operator can be further reduced.

Figure 27:
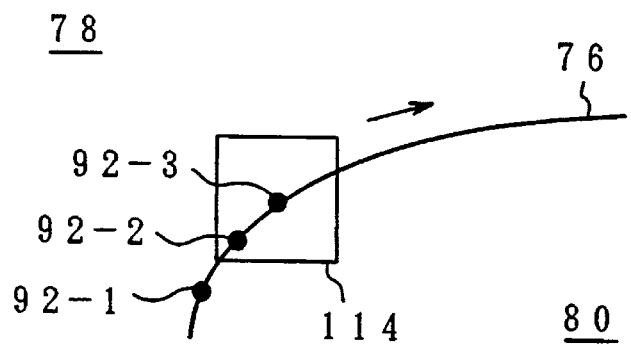
FIG. 27 is an explanatory diagram for the outline tracking by the designation of an outline region.

FIG. 27 shows a method of performing the outline tracking in correspondence to the designation of the outline region of the target object in FIG. 11. A figure shape indicative of a certain range, for example, a rectangular cursor 114 is displayed on the monitor screen so as to be overlapped to the image of the target object 80, thereby enabling the cursor 114 to be moved by the mouse. The operator moves the cursor 114 along the object outline 76 as shown in the diagram so that the object outline 76 enters the cursor 114. When the operator instructs the boundary detecting process or the like by a mouse clicking operation or the like each time the cursor 114 is moved, the boundary pixels 92-1, 92-2, and 92-3 are sequentially detected by the method of FIG. 12 or 19. The outline detecting method whereby the cursor 114 is moved along the object outline is effective for an image such that the boundary is more obscure although the burden on the operator increases as compared with the outline detection by the designation of one or a plurality of points, the designation of the color, or the like. Even when the burden on the operator is slightly increased, the boundary can be detected at a high precision.

Third Embodiment of Mask Teaching Data Forming Process by Outline Detection

Figure 28:
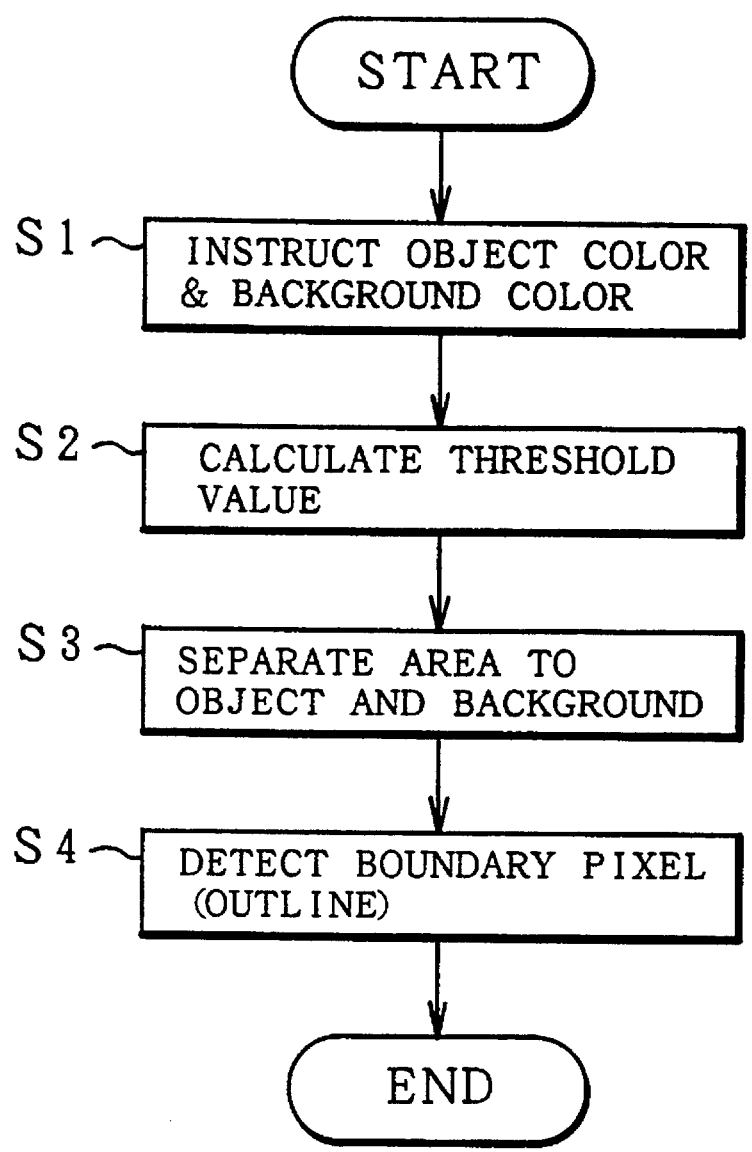
FIG. 28 is a flowchart in the third embodiment of the mask teaching data forming process by the outline detection in FIG. 9.

A flowchart of FIG. 28 shows the third embodiment of the mask teaching data forming process by the object outline detection of FIG. 9. The third embodiment is characterized in that two points of the object color and background color are designated and the outline is detected by using a difference between the colors. First in step S1, the operator designates one point in the object as a target of the outline detection and one point in the background around the object and obtains the object color and background color at the designated points. In step S2, a threshold value is calculated from the image data of two colors of the object color and background color derived in step S1. In step S3, the whole image data is separated into two regions of the object and background by using the calculated threshold value. In step S4, the boundary of the two separated regions is detected as an outline of the object. As a threshold value to separate the whole image data into the object and the background in step S3, the additive color mixture ratio, the mean value of the two image data of the object and background, or the like can be used. Such a method of detecting the outline on the basis of the object color and background color is effective to an image such that the object color and the background color clearly differ.

Figure 29:
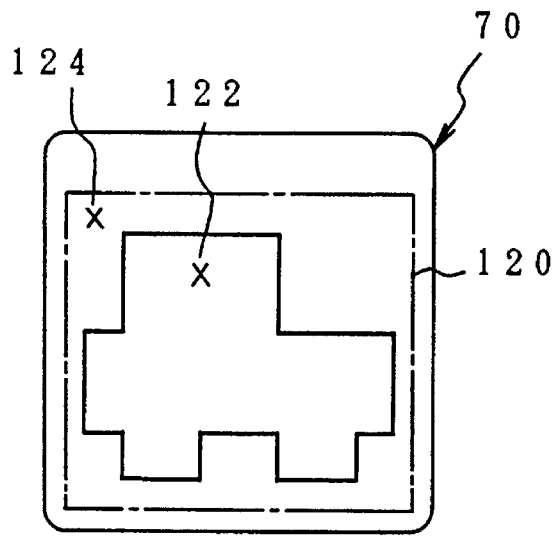
FIG. 29 is an explanatory diagram for the outline detection by the designation of an object color and a background color.

FIG. 29 shows a state of the outline detecting process in FIG. 28. First, for the image on the monitor screen 70, the operator indicates a designated point 122 to obtain the representative color of the object color and a designated point 124 to instruct the representative color of the background color by using the mouse or the like. As for the monitor screen 70, by previously designating a target region of the outline detection based on the background color and object color as a designated region 120, the outline detecting process can be executed with respect to a part of the display image. When the designated points 122 and 124 are indicated, the threshold value of the image data regarding each color is calculated and a discrimination about the object or background is performed with respect to the image data of all of the pixels in the designated region 120. For instance, when considering the RGB color space as an example, now assuming that the background color of the designated point 124 is set to (R0, G0, B0) and the object color of the designated point 122 is set to (R1, G1, B1), the threshold value is obtained by $$\{(R0+R1)/2, (G0+G1)/2, (B0+B1)/2\}$$

The judgment regarding the object or background is made by using the threshold value. It is also possible to construct in a manner such that the additive color mixture ratio is obtained as shown in FIG. 13 every data of each pixel of the designated region 120, and when the obtained ratio is equal to or larger than a set value, for example, 0.5, it is judged to be the object and, when the ratio is smaller than 0.5, it is judged to be the background.

Figure 30:
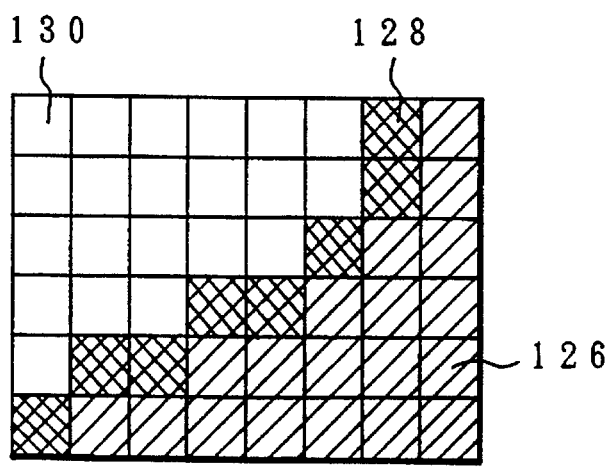
FIG. 30 is an explanatory diagram for setting of outline pixels of an image divided into regions of an object color and a background color.

FIG. 30 shows a method of detecting the outline from the judgment result about the background region and object region based on the threshold value. In this case, the pixel at the position which is in contact with the pixels of two regions with respect to an object pixel 126 and a background pixel 130 which were separated is judged as a boundary pixel 128. A coupling of such a boundary pixel 128 is detected as an outline of the object.

Although FIGS. 9 to 30 relate to the example of the formation of the mask teaching data by the semi-auto in the mode-3 in FIG. 5, the processes excluding the designation by the operator in the mode-3 (semi-auto) are executed in the mode-2 (perfect auto).

Forming Process of Mask Data from Real Image Data

Figure 31:
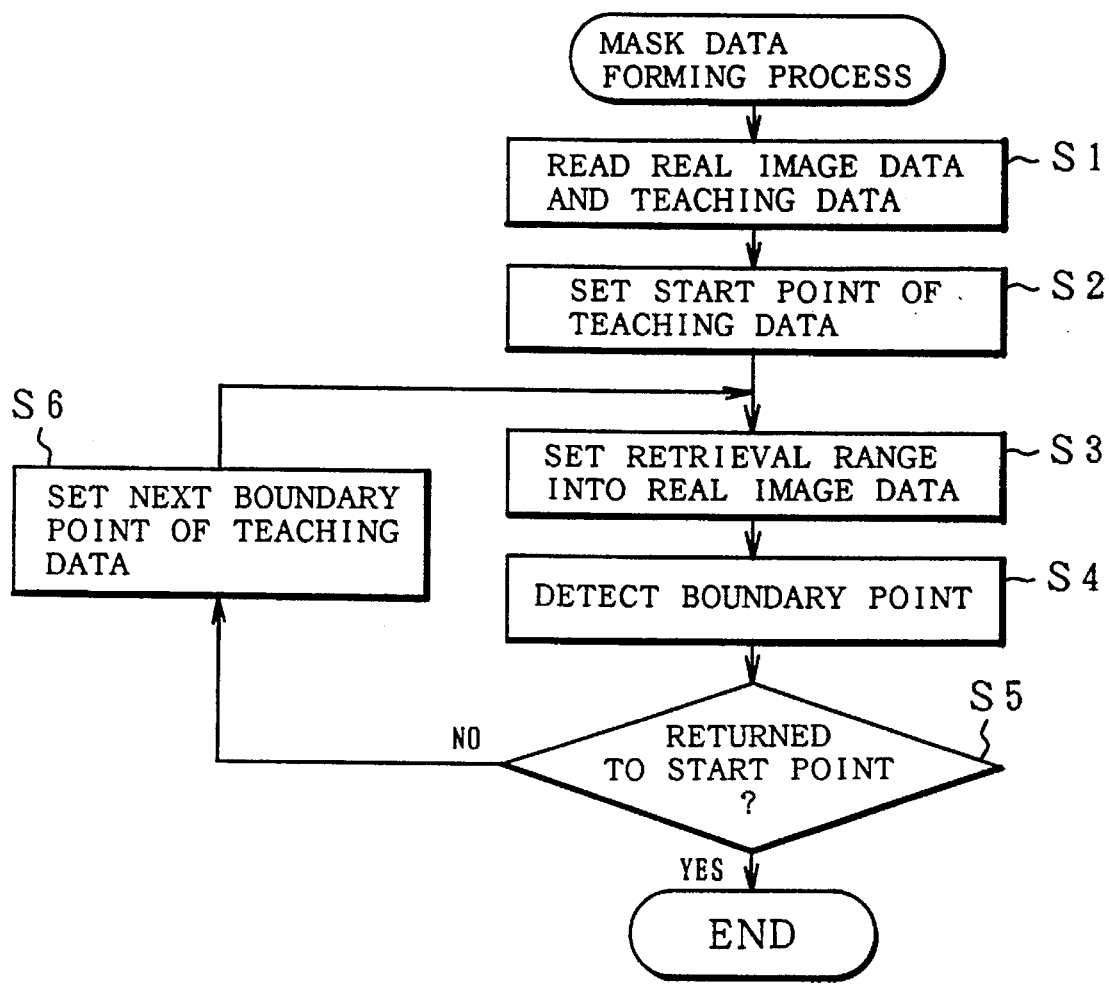
FIG. 31 is a flowchart for a forming process of a mask pattern by using real image data as a target on the server unit side in FIG. 4.

A flowchart of FIG. 31 relates to the mask data forming process such that the server unit 12 forms the mask data from the real image data by using the mask teaching data sent from the workstation 10 in step S102 in FIG. 4. First in step S1, the mask data forming processing section 30 of the server unit 12 stores the mask teaching data 40-2 transferred from the workstation 10 and the corresponding real image data 34 stored in the data base 14 into the internal memory 32. In step S2, a predetermined start point is set with respect to the mask teaching data 40-2. In step S3, the retrieval range is set into the real image data on the basis of the setting of the start point of the teaching data. In step S4, the boundary point is detected with respect to the real image data as a target. When the boundary point can be detected with regard to the real image data, a check is made in step S5 to see if the boundary point has been returned to the start point of the teaching data or not. If NO, the next boundary point of the mask teaching data is set in step S6. The processes in steps S3 and S4 are repeated. As a method of setting the retrieval range and detecting the boundary point for the real image data in steps S3 and S4, a method by the difference detection of the retrieval range in FIG. 12 or the method by the color mixture ratio in the retrieval range in FIG. 19 can be applied as it is. The mask data formed with respect to the real image data as a target which uses the mask teaching data as a guidance in FIG. 31 is stored as mask data 42 into the data base 14.

According to the invention as mentioned above, in a construction of the distributed process such that the real image data is stored into the data base on the server side and the operator executes the forming work of the mask data on the workstation side as a client, the workstation side handles the thin-out image data derived by the thin-out process of the real image data. Therefore, the internal memory of a small capacity can be used. The time which is required for the load transfer of the image data from the server can be decreased. The system costs can be reduced. The system performance in the distributed process can be improved.

In the workstation, it is sufficient to merely execute the forming process of the mask teaching data with respect to the thin-out image data as a target. In the formation of the precise mask data with respect to the final real image data as a target, the mask teaching data is sent to the server side and such a formation is executed by the process on the server side. Therefore, a processing burden on the workstation side is small. The mask data of a high precision using the mask teaching data as a guidance can be finally formed from the real image data on the server side.

With respect to the formation of the mask data from the real image data on the server side, since the mask teaching data formed on the workstation side is used as a guidance, even if the operator doesn't intervene in the process on the server side, a situation such that the erroneous outline detection is performed by the abnormal boundary detecting process doesn't occur. The mask data can be efficiently formed at a high precision from the real image data.

In the above embodiments, the teaching data forming processing section 18 of the workstation 10 has selected either one of the four modes 1 to 4 as shown in FIG. 5, thereby enabling the mask teaching data to be formed. However, only either one of the four modes can be also provided. The above embodiments have been described with respect to the client server system, as an example, in which the workstation 10 as a client is connected to the server unit 12 having the data base 14 through the local area network 16. However, the invention can be also applied as it is to a proper distribution system without being limited to the server client system so long as it is a system in which the unit to manage the real image data and the unit to form the mask data by receiving the transferred image data based on the real image data are distributed and arranged through a communication line.

The communication line is not limited to a wire like a local area network but also includes a case where the processing unit on the client side is connected by a radio line. In addition to the server client system, the invention can be also applied as it is to a system such that the host computer has a data base and the workstation is connected to the host computer by the communication line.

What is claimed is:

1. A distributed image processing apparatus, comprising:
   an image managing unit to manage a data base in which real image data has been stored;
   a processing unit connected to said image managing unit through a communication line;
   a teaching data forming section within said processing unit for forming mask teaching data indicative of an outline of an object and transferring to said image managing unit with respect to thin-out image data obtained from the real image data stored in said data based as a target; and a mask data forming section within said image managing unit for forming mask data indicative of the object outline from the real image data in said data base by using said mask teaching data transferred from said teaching data forming section as a reference.

2. An apparatus according to claim 1, wherein the thin-out image data derived from the real image data is previously stored in said data base.

3. An apparatus according to claim 1, wherein said teaching data forming section forms the mask teaching data indicative of the object outline with respect to said thin-out image data as a target in accordance with an instruction of an operator.

4. An apparatus according to claim 1, wherein said teaching data forming section automatically forms the mask teaching data indicative of the object outline with respect to said thin-out image data as a target.

5. An apparatus according to claim 1, wherein said teaching data forming section automatically forms the mask teaching data indicative of the object outline with respect to said thin-out image data as a target on the basis of outline information instructed by an operator.

6. An apparatus according to claim 5, wherein said teaching data forming section detects a boundary point on the basis of a designated point indicative of a position near the outline of the target object instructed by the operator, sequentially searching a boundary point on the outline from the boundary point detected, and forms the mask teaching data indicative of the object outline.

7. An apparatus according to claim 5, wherein said teaching data forming section searches the inside of the boundary region including the outline of the target object instructed by the operator and forms the mask teaching data indicative of the object outline.

8. An apparatus according to claim 5, wherein said teaching data forming section detects each boundary point on the basis of a plurality of designated point information indicative of positions near the outline of the target object instructed by the operator, sequentially searches a boundary point on the outline in accordance with a path connecting said plurality of boundary points detected, and forms the mask teaching data indicative of the object outline.

9. An apparatus according to claim 5, wherein said teaching data forming section searches the boundary point on the basis of a difference value of the pixel data in a boundary region and forms the mask teaching data indicative of the object outline.

10. An apparatus according to claim 5, wherein said teaching data forming section calculates a color mixture ratio in a boundary portion on the basis of an object color and a background color of the target object, searches a boundary point at which a specific color mixture ratio is obtained, and forms the mask teaching data indicative of the object outline.

11. An apparatus according to claim 5, wherein said teaching data forming section overlaps the searched mask teaching data onto the thin-out image data displayed on a display and displays the resultant overlapped data, thereby enabling the operator to monitor an abnormal search.

12. An apparatus according to claim 5, wherein said teaching data forming section has an editing function for correcting the mask teaching data displayed on a display on the basis of an instruction of the operator.

13. An apparatus according to claim 1, wherein a server client system in which said image managing unit is set to a server and said processing unit is set to a client is constructed.

14. An apparatus to claim 13 wherein said client is connected as a workstation to said server by a local area network.

15. A distributed image processing apparatus, comprising:
a data base in which one or a plurality of original shape data indicative of an object shape as a target to form real image data and mask data have been stored;
an image managing unit to manage said data base;
a processing unit connected to said image managing unit through a communication line;
a teaching data forming section within said processing unit for selecting, as mask teaching data, said original shape data adapted to an object as a detection target of an outline in thin-out image data obtained from the real image data in said data base and for notifying to said image managing unit; and
a mask data forming section within said image managing unit for forming mask data indicative of the object outline from the real image data in said data base by using said mask teaching data transferred from said teaching data forming section as a reference.

16. An apparatus according to claim 15, wherein said teaching data forming section overlaps the selected original shape data onto the thin-out image data displayed on a display and displays the resultant overlapped data, thereby allowing an operator to judge an adaptability.

17. An apparatus according to claim 16, wherein said mask data forming section automatically forms the mask data indicative of the object outline with respect to said real image data as a target on the basis of said mask teaching data.

18. An apparatus according to claim 15, wherein a server client system in which said image managing unit is set to a server and said processing unit is set to a client is constructed.

19. An apparatus according to claim 15, wherein said client is connected as a workstation to said server by a local area network.

20. An image processing apparatus, comprising:
a teaching data forming unit forming mask teaching data indicative of an outline of an object from thin-out image data obtained from real image data stored in a data base; and
a mask data forming unit forming mask data indicative of the object outline from said real image data by using said mask teaching data as a reference.

21. An image processing apparatus, comprising:
a data base having one or a plurality of original shape data indicative of a shape of an object as a target to form real image data and mask data;
a teaching data forming unit selecting said original shape data, as mask teaching data, adapted to the object as a target to detect an outline in thin-out image data obtained from the real image data in said data base; and
a mask data forming unit forming mask data indicative of an outline of the object from the real image data of said data base by using said mask teaching data as guidance.

22. A distributed processing system, comprising:
a communications link;
a local processing unit connected to said communications link and allowing a user to designate an initial mask of an image at a first resolution for further processing; and
an image management unit connected to said communications link, providing the image at the first resolution to said local processing unit over said communications link, receiving the initial mask from the local processing unit over said communications link and performing image processing on the image at a second higher resolution.

23. A distributed processing system, comprising:
a communications link;
a local processing unit connected to said communications link and allowing a user to designate an initial mask of an image at a first resolution using shape data; and
an image management unit connected to said communications link, providing the image at the first resolution to said local processing unit over said communications link, receiving the initial mask from the local processing unit over said communications link and performing image processing on the image at a second higher resolution to form a refined mask.

* * * * *